US008605910B2

(12) United States Patent
Franck et al.

(10) Patent No.: US 8,605,910 B2
(45) Date of Patent: Dec. 10, 2013

(54) DEVICE AND A METHOD FOR DETERMINING A COMPONENT SIGNAL WITH HIGH ACCURACY

(71) Applicant: Fraunhofer-Gesellschaft zur Foerderung der angewandten Forschung e.V., Munich (DE)

(72) Inventors: Andreas Franck, Ilmenau (DE); Sandra Brix, Ilmenau (DE); Thomas Sporer, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/891,282

(22) Filed: May 10, 2013

(65) Prior Publication Data

US 2013/0243203 A1 Sep. 19, 2013

Related U.S. Application Data

(62) Division of application No. 12/678,775, filed as application No. PCT/EP2008/007201 on Sep. 3, 2008, now Pat. No. 8,526,623.

(30) Foreign Application Priority Data

Sep. 19, 2007 (DE) ......................... 10 2007 044 687
Dec. 11, 2007 (DE) ......................... 10 2007 059 597

(51) Int. Cl.
*H04R 5/00* (2006.01)
*G06F 17/00* (2006.01)

(52) U.S. Cl.
USPC ................................. 381/17; 381/18; 700/94

(58) Field of Classification Search
USPC ............ 381/17–23, 309, 310, 59, 63, 98, 99; 700/94
See application file for complete search history.

(56) References Cited

U.S. PATENT DOCUMENTS

2008/0192965 A1 * 8/2008 Strauss et al. ................ 381/300

OTHER PUBLICATIONS

G. Jansen, "Focused wavefields and moving virtual sources by wavefield synthesis", Aug. 1997.*
Bleda et al., "Design and implementation of a compatible wave field synthesis authoring tool", May 2005, Audio Engineering Society.*
Cadan, "An efficient filtering structure for Lagrange interpolation", Jan. 2007.*

(Continued)

*Primary Examiner* — Vivian Chin
*Assistant Examiner* — David Ton
(74) *Attorney, Agent, or Firm* — Keating & Bennett, LLP

(57) ABSTRACT

A device for determining a component signal for a WFS system includes a provider for providing WFS parameters, a WFS parameter interpolator, and an audio signal processor. The provider provides WFS parameters for a component signal while using a source position and while using the loudspeaker position at a parameter sampling frequency smaller than the audio sampling frequency. The WFS parameter interpolator interpolates the WFS parameters so as to produce interpolated WFS parameters which are present at a parameter interpolation frequency that is higher than the parameter sampling frequency, the interpolated WFS parameters having interpolated fractions which have a higher level of accuracy than is specified by the audio sampling frequency. The audio signal processor is configured to apply the interpolated fractional values to the audio signal such that the component signal is obtained in a state of having been processed at the higher level of accuracy.

11 Claims, 12 Drawing Sheets

(56) References Cited

OTHER PUBLICATIONS

Laakso et al., "Principles of fractional delay filters", 2000, IEEE, 0-7803-6293-4/00, pp. 3870-3873.*

Farrow, "A continously Variable digital delay element", 1998, IEEE, pp. 2641-2645.*

Franck et al., "A Device and a Method for Determining a Component Signal With High Accuracy", U.S. Appl. No. 12/678,775, filed Apr. 22, 2010.

* cited by examiner (a) amplitude (b) phase delay

DEVICE AND A METHOD FOR DETERMINING A COMPONENT SIGNAL WITH HIGH ACCURACY

The present invention relates to a device and a method for determining a component signal with high accuracy for a WFS (wave field synthesis) system and, in particular, to an efficient algorithm for delay interpolation for wave field synthesis rendering, or replay, systems.

BACKGROUND OF THE INVENTION

Wave field synthesis is an audio reproduction method for spatial rendering of complex audio scenes that was developed at the Delft University of Technology. Unlike most existing methods of audio reproduction, spatially correct rendering is not restricted to a small area, but extends across an extensive rendering area. WFS is based on a sound mathematical-physical foundation, namely the principle of Huygens and the Kirchhoff-Helmholtz integral.

Typically, a WFS reproduction system consists of a large number of loudspeakers (so-called secondary sources). The loudspeaker signals are formed from delayed and scaled input signals. Since many audio objects (primary sources) are typically used in a WFS scene, a very large number of such operations may be performed for producing the loudspeaker signals. This accounts for the high level of computing power that may be useful for wave field synthesis.

In addition to the above-mentioned advantages, WFS also offers the possibility of realistically imaging moving sources. This feature is exploited in many WFS systems and is of great importance, for example, for utilization in cinemas, virtual-reality applications or live performances.

However, rendering moving sources causes a series of characteristic errors that do not occur in the case of static sources. Signal processing of a WFS rendering system has a significant impact on the rendering quality.

A primary goal is to develop signal processing algorithms for rendering moving sources by means of WFS. In this context, real-time capability of the algorithms is an important precondition. The most important criterion for evaluating the algorithms is the objective perceived audio quality.

As has been said, WFS is a method of audio reproduction that is very costly in terms of processing resources. This is due, above all, to the large number of loudspeakers employed in a WFS setup, and to the fact that the number of virtual sources used in WFS scenes is often high. For this reason, the efficiency of the algorithms to be developed is of outstanding importance.

An important issue is about which quality improvement is to be achieved by the algorithms to be developed. This is specifically true while taking into account the other artefacts caused by the WFS which possibly make themselves felt in an even more interfering manner or mask the artefacts of signal processing, depending on the quality of the signal processing algorithms. Therefore, the focus is on developing algorithms whose qualities are scalable via various parameters (e.g. interpolation orders, filter lengths, etc.). As an extreme case, this includes algorithms whose rendering errors are below the threshold of perception under optimized conditions (omission of any other artefacts). Depending on the quality desired, the markedness of the other artefacts and the resources available, an optimum tradeoff may be found.

A series of criteria and ranges of values may be defined which facilitate designing algorithms. They include:

(a) Reliable source speeds. Generally, virtual sources having random source speeds are to be supported. However, the influence of the Doppler shift increases as the speed increases. In addition, many physical laws that are also used in WFS only apply to speeds below the speed of sound. Therefore, the following admissible range is specified as a range which is considered to be useful for the source speed $v_{src}$:

$$|v_{src}| \leq \frac{1}{2}c.$$

In this context, c is the speed of sound of the medium. Under standard conditions, the allowed speed of sources therefore amounts to about 172 m/s, or 619 km/h.

(b) Frequency ranges. The entire audio frequency range, i.e.

$$20\text{ Hz} \leq f \leq 20\text{ kHz} \tag{1},$$

shall be assumed as the rendering range for the frequency f.

It is to be noted that the selection of the upper cutoff frequency and of the quality to be achieved thereby has a decisive impact on the algorithms' resource requirements.

(c) Sampling frequency. The selection of the sampling rate has a large impact on the algorithms to be designed. On the one hand, the error of most delay interpolation algorithms increases sharply as the distance of the frequency range of interest from the Nyquist frequency decreases. Also, the lengths of many filters that may be used by algorithms increases sharply as the range between the upper cutoff frequency of the audio frequency range and the Nyquist frequency becomes narrower, since this range is used as a so-called don't-care band in many filter design processes.

Changes in the sampling frequency may therefore entail extensive adaptations of the filters used and other parameters, and may therefore also decisively influence the performance and the suitability of specific algorithms.

As a standard feature, systems common in professional audio technology are operated at a sampling rate of 48 kHz. Therefore, this sampling frequency shall be assumed in the following.

(d) Target hardware. Even though the algorithms to be developed are generally independent of the hardware used, specifying the target platform is useful for various reasons:

(i) The architecture of the CPUs employed, e.g. supporting parallel work, has an impact on the design of the algorithms.

(ii) The size and architecture of the memory used influence design decisions with regard to designing algorithms.

(iii) For specifying performance requirements, indications of the efficiency of the target hardware are useful.

Since systems currently and in the foreseeable future are (will be) mostly based on PC technology, the following properties shall be assumed:

Current desktop or work station standard components on the basis of x86 technology, No utilization of special hardware, Processors with performant |floating-point functionality, Comparatively large working memory, and Typically support of SIMD instruction sets (e.g. SSE).

Algorithmics in audio signal processing in wave field synthesis may be divided up into various categories:

(1) Calculating the WFS parameters. By applying the WFS synthesis operator, a scaling value and a delay value are determined for each combination of source and loudspeaker. This calculation is performed at a relatively low frequency. Between these nodes, the scale and delay values are interpolated by means of simple methods. Therefore, the influence on the performance is comparatively small.

(2) Filtering. For implementing the WFS operator, filtering using a low-pass filter with an edge steepness of 3 dB may be useful. Additionally, an adaptation to the rendering conditions may be performed, said adaptation being dependent on the source or loudspeaker. However, since the filter operation is performed only once per input and/or output signal, respectively, the performance requirement is generally moderate. In addition, in current WFS systems, this operation is performed on dedicated arithmetic units.

(3) WFS scaling. This operation, which is often incorrectly referred to as WFS convolution, applies the delay calculated by the synthesis operator to the input signals stored in a delay line, and scales this signal with a scaling also calculated by the synthesis operator. This operation is performed for each combination of virtual source and loudspeaker. The loudspeaker signals are formed by summing all of the scaled input signals for the loudspeaker in question.

Since WFS scaling is performed for each combination of virtual source and loudspeaker as well as for each audio sample, it forms the main proportion of the resource requirements of a WFS system even if the individual operation has very low complexity.

In addition to the known rendering errors (artefacts) of WFS, a series of further characteristic errors occur with moving sources. The following errors may be identified:

(A) Comb filter effects (spatial aliasing). The spatial aliasing known from rendering static sources produces, above the aliasing frequency, an interference pattern that is dependent on the source position and on the frequency and is coined by superelevations and sharp depressions. In the event of movements of the virtual source, this pattern changes dynamically and thus produces time-dependent frequency distortion for an observer who is not moving.

(B) Non-observance of the delayed time. For calculating the WFS parameters, the current position of the source is used. However, for accurate rendering, the decisive position is that from which the currently impinging sound was sent out. This creates a systematic error of the Doppler shift which, however, is relatively small for moderate speeds and is very likely not to be perceived as disturbing in most WFS applications.

(C) Doppler spread. Due to the different relative speeds, a moving source leads to various Doppler frequencies in the signals emitted by the secondary sources. Said Doppler frequencies express themselves, at the hearing location, in a broadening of the frequency spectrum of the virtual source. This error cannot be explained by the WFS theory and is an object of current research.

(D) Audio disturbances due to delay interpolation. For WFS scaling, input signals that are delayed by a random amount may be useful which are calculated from the discrete samples that are present only at random points in time. The algorithms used for this purpose differ strongly in terms of quality and often produce artefacts that are perceived as disturbing.

The natural Doppler effect, i.e. the frequency shift of a moving source, is not classified as an artefact here, since it is a property of the primary sound field to be rendered by a WFS system. Nevertheless, it is undesired in many applications.

The operation of determining the value of a time-discretely sampled signal at random points in time is referred to as delay interpolation or fractional-delay interpolation.

To this end, a large number of algorithms have been developed which strongly differ in terms of complexity and quality of the interpolation. Generally, fractional-delay algorithms are implemented as discrete filters which have a time-discrete signal as their input, and an approximation of the delayed signal as their output.

Fractional-delay interpolation algorithms may be classified by various criteria:

(I) Filter structure. FD (fractional delay) filters may be implemented both as FIR (finite impulse response) and as IIR (infinite impulse response) filters.

FIR filters generally may use a larger number of filter coefficients and, thus, of arithmetic operations, and also, they produce amplitude errors for random fractional delays. However, they are stable, and there are many design processes, which include many closed, non-iterative design processes.

IIR filters may be implemented as all-pass filters, which exhibit an amplitude response which is precisely constant and, thus, ideal for FD filters. However, it is not possible to influence the phase of an IIR filter as precisely as in the case of an FIR filter. Most design methods for IIR-FD filters are iterative, and accordingly, they are not suited for real-time applications with variable delays. The only exceptions are Thiran filters, for which explicit formulae for the coefficients exist. For implementing IIR filters, it is useful to store the value of the preceding outputs. This is unfavorable for implementation in a WFS reproduction system, since a multitude of previous output signals would have to be administered. In addition, utilization of internal states reduces the suitability of IIR filters for variable delays, since the internal state was possibly calculated for a different fractional delay than the current one. This leads to interferences in the output signal which are referred to as transients.

For these reasons, only FIR filters will be studied for utilization in WFS reproduction systems.

(II) Fixed and variable fractional delays. Once their coefficients have been designed, FD filters are valid only for a specific delay value. The design operation may be performed again for each new value. Depending on the cost of this design operation, methods are suited to varying degrees for real-time operation with variable delays.

Methods for variable fractional delays (VFD) combine the coefficient calculation and the filter calculation and are therefore very well suited for real-time changes in the delay value. They are a variant of variable digital filters.

(III) Asynchronous sampling rate conversion. In WFS, continuously variable delays are useful. In the reproduction of a virtual source which moves linearly to a secondary source, the delay is a linear function of time, for example. This operation may be classified as an asynchronous sampling rate conversion. Methods for asynchronous sampling rate conversion are typically implemented on the basis of variable fractional-delay algorithms. In addition, however, they exhibit several problems that are to be solved additionally, e.g. the usefulness of suppressing imaging and aliasing artefacts.

(IV) Range of values of the fractional-delay parameter. The range of the variable delay parameter $d_{frac}$ is dependent on the method used and is not necessarily the range $0 \leq d_{frac} \leq 1$. For most FIR methods, it is within the range of $$\frac{N-1}{2} \leq d_{frac} \leq \frac{N+1}{2},$$

N being the order of the method. In this manner, the deviation from a linear-phase behavior is minimized. An exactly linear-phase behavior is possible only for specific values of $d_{frac}$.

By decomposing the desired delay value d into an integer value $d_{int}$ and a fractional portion $d_{frac}$, random delays may be produced by using a fractional-delay filter. The delay by $d_{int}$ is implemented, in this context, by an index shift in the input signal.

However, adhering to the ideal working range results in a minimum value of the delay, which may not be fallen below in order to keep to the causality. Therefore, methods for delay interpolation, specifically high-quality FD algorithms with long filter lengths, also entail an increase in the system latency. However, said system latency does not exceed an order of magnitude of 20 . . . 50 samples even for extremely costly processes. However, this is generally low as compared to other latencies of a typical WFS rendering system that are determined by the system.

The usefulness of delay interpolations results from the following considerations:

In the synthesis of moving sound sources by means of WFS, the delay applied to the audio signals are time-variant. Signal processing (rendering) of a WFS rendering system is performed in a time-discrete manner; therefore, source signals only exist at specified sampling times. The delay of a time-discrete signal by a multiple of the sampling period is possible in an efficient manner and is implemented by shifting the signal index. Accessing a value of a time-discrete signal that is located between two sampling points is referred to as delay interpolation or fractional delay. To this end, specific algorithms may be used which strongly differ in terms of quality and performance. An overview of fractional-delay algorithms shall be provided.

In WFS of moving sources, the delay times that may be used change dynamically and may adopt random values. Generally, a different delay value may be used for each loudspeaker signal. The algorithms used therefore may support random, variable delays.

While rounding off the delay to the nearest multiple of the sampling period provides sufficiently good results with static WFS sources, this method results in marked interferences with moving sources.

For wave field synthesis, a delay interpolation becomes useful for each combination of virtual source and loudspeaker. In connection with the complexity—useful for high rendering quality—of the delay interpolation, high-quality real-time implementation is not practicable.

The usefulness of delay interpolation for moving sources is described in Edwin Verheijen: "Sound repodiction by way field synthesis", PhD thesis (pages 106-110), Delft University of Technology, 1997". However, only simple (standard) delay interpolation methods are utilized for realizing the algorithms.

In Marije Baalman, Simon Schmpijer, Torben Hohn, Thilo Koch, Daniel Plewe and Eddie Mond: "Creating a large scale wave field synthesis system with swonder", in Procc. of the $5^{th}$ International Linux Audio Conference, Berlin, Germany, March 1997, the usefulness of a sampling rate conversion with moving virtual sources is pointed out. An algorithm is outlined on the basis of the Bresenham algorithm. However, this is an algorithm, based on integer calculation, of graphic data processing for plotting lines on rastered rendering devices. Therefore, it is to be assumed that it is not a real, interpolating sampling rate conversion, but a round-off of the nodes to the nearest integer sample index.

Various simple methods for delay interpolation are implemented in WFS renderers. By means of the class hierarchy used, the methods may simply be replaced. In addition to delay interpolation, temporal interpolation of the WFS parameters of delay (and also of scale) has an influence on the quality of the sampling rate conversion. In the conventional renderer structure, these parameters are updated only within a fixed raster (currently at a frequency of 32 audio samples).

The following algorithms are implemented:

IntegerDelay. This the original algorithm. It does not support any delay interpolation, i.e. delay values are rounded off to the nearest multiple of the sampling period. The delay and scaling parameters are updated within a raster of currently 32 samples. This algorithm is implemented in an optimized assembler variant and is suitable for real-time rendering of entire WFS scenes. Nevertheless, this operation takes up the major portion of the computational load that may be used within the renderer.

BufferwiseDelayLinear. The WFS parameters are adapted within a coarse raster (notation: bufferwise), the delayed signals themselves are calculated with a delay interpolation on the basis of a linear interpolation. Implementation is performed with the support of an assembler and is suitable, in terms of performance, for being employed with entire WFS scenes. This algorithm is currently used as a default setting.

SamplewiseDelayLinear. In this method, scaling and delay values are interpolated for each sample (notation: samplewise). Delay interpolation is again performed by linear interpolation (i.e. $1^{st}$-order Lagrange interpolation). This method is clearly more costly than the previous ones, and additionally, it exists only in a C++ reference implementation. Therefore, it is not suitable for being used with real, complex WFS scenes.

SamplewiseDelayCubic. Here, too, scale and delay are interpolated in a manner that is exact to the sample. The delay interpolation is performed using a third-order (i.e. cubic) Lagrange interpolator. This method, too, only exists as a reference implementation and is suitable exclusively for small numbers of sources.

SUMMARY

According to an embodiment, a device for determining a component signal that is suitable for a WFS system including an array of loudspeakers, the WFS system being configured to exploit an audio signal that is associated with a virtual source and that exists as a discrete signal sampled at an audio sampling frequency, and a source position associated with the virtual source, so as to calculate component signals for the loudspeakers on the basis of the virtual source while taking into account loudspeaker positions of loudspeakers of the array of loudspeakers, may have: a provider for providing WFS parameters for the component signal to a loudspeaker of the array of loudspeakers while using the source position and while using a loudspeaker position of the loudspeaker of the array of loudspeakers at a parameter sampling frequency smaller than the audio sampling frequency, the WFS parameters including delay values; a WFS parameter interpolator for interpolating the WFS parameters so as to produce interpolated WFS parameters which are present at a parameter interpolation frequency that is higher than the parameter sampling frequency, the interpolated WFS parameters including integer portions of delay values and interpolated fractions of delay values, the interpolated fractions constituting delays which define fractions of sample intervals of the audio signal; and wherein an audio signal processor may have: a preprocessor that includes an oversampler, the preprocessor being configured to process the audio signal, which is associated with the virtual source, independently of the WFS parameters, and the oversampler being configured to oversample the audio signal, which is present as a discrete signal sampled at an audio sampling frequency; a buffer for buffering the processed audio signal, the means for buffering being configured to store the processed audio signal index by index, so that each index corresponds to a predetermined time value of the audio signal; and a producer for producing the component signal, the producer being configured to produce the component signal from a processed audio signal belonging to a specific index, it being possible for said specific index to be determined from the integer portion of the delay value, the audio signal processor being configured to apply the interpolated fractions to the processed audio signal such that the component signal is calculated with fraction delays which correspond to the interpolated fractions.

According to another embodiment, a device for determining a component signal that is suitable for a WFS system including an array of loudspeakers, the WFS system being configured to exploit an audio signal that is associated with a virtual source and that exists as a discrete signal sampled at an audio sampling frequency, and a source position associated with the virtual source, so as to calculate component signals for the loudspeakers on the basis of the virtual source while taking into account loudspeaker positions of loudspeakers of the array of loudspeakers, may have: a provider for providing WFS parameters for a component signal to a loudspeaker of the array of loudspeakers while using the source position and while using a loudspeaker position of the loudspeaker of the array of loudspeakers at a parameter sampling frequency smaller than the audio sampling frequency, the WFS parameters including delay values; a WFS parameter interpolator for interpolating the WFS parameters so as to produce interpolated WFS parameters which are present at a parameter interpolation frequency that is higher than the parameter sampling frequency, the interpolated WFS parameters including integer portions of delay values and interpolated fractions of delay values, the interpolated fractions constituting delays which define fractions of sample intervals of the audio signal; and an audio signal processor including: a preprocessor that includes a Farrow structure, the preprocessor being configured to process the audio signal, which is associated with the virtual source, independently of the WFS parameters so as to acquire a processed audio signal; a buffer for buffering the processed audio signal, the buffer being configured to store the processed audio signal index by index, so that each index corresponds to a predetermined time value of the audio signal; and a producer for producing the component signal, the producer being configured to produce the component signal from a processed audio signal belonging to a specific index, it being possible for said specific index to be determined from the integer portion of the delay value, the audio signal processor being configured to apply the interpolated fractions to the processed audio signal such that the component signal is calculated with fraction delays which correspond to the interpolated fractions.

According to another embodiment, a method of determining a component signal that is suitable for a WFS system including an array of loudspeakers, the WFS system being configured to exploit an audio signal that is associated with a virtual source and that exists as a discrete signal sampled at an audio sampling frequency, and a source position associated with the virtual source, so as to calculate component signals for the loudspeakers on the basis of the virtual source while taking into account loudspeaker positions of loudspeakers of the array of loudspeakers, may have the steps of: providing WFS parameters, which include delay values, for the component signal to a loudspeaker of the array of loudspeakers while using the source position and while using a loudspeaker position of the loudspeaker of the array of loudspeakers at a parameter sampling frequency smaller than the audio sampling frequency, the WFS parameters being delay values; interpolating the WFS parameters so as to produce interpolated WFS parameters which are present at a parameter interpolation frequency that is higher than the parameter sampling frequency, the interpolated WFS parameters including integer portions of delay values for the component signal and interpolated fractions of delay values for the component signal, said interpolated fractions constituting delays which define fractions of sample intervals of the audio signal; and processing the audio signal so as to apply the interpolated fractions to the audio signal such that the component signal is calculated with fraction delays which correspond to the interpolated fractions, wherein processing the audio signal may have the steps of: oversampling the audio signal with a predetermined oversampling value; storing the oversampled values within a buffer, the integer portion of the delay value serving as an index; reading out oversampled values from the buffer to the index; interpolating the oversampled values so as to acquire a component signal with the interpolated fraction of the delay value, the oversampled values serving as nodes; or wherein processing the audio signal may have the steps of: processing the audio signal in subfilters, so that each subfilter produces an output signal; storing the output signals of the subfilters within the buffer; reading out the output values from a position which corresponds to the integer portion of the delay value; determining an interpolated value by calculating a polynomial in the interpolated fraction so that a component signal is acquired from the interpolated fraction of the delay value and of the output values of the subfilters.

According to another embodiment, a computer program may have a program code for performing the method of determining a component signal that is suitable for a WFS system including an array of loudspeakers, the WFS system being configured to exploit an audio signal that is associated with a virtual source and that exists as a discrete signal sampled at an audio sampling frequency, and a source position associated with the virtual source, so as to calculate component signals for the loudspeakers on the basis of the virtual source while taking into account loudspeaker positions of loudspeakers of the array of loudspeakers, wherein the method may have the steps of: providing WFS parameters, which include delay values, for the component signal to a loudspeaker of the array of loudspeakers while using the source position and while using a loudspeaker position of the loudspeaker of the array of loudspeakers at a parameter sampling frequency smaller than the audio sampling frequency, the WFS parameters being delay values; interpolating the WFS parameters so as to produce interpolated WFS parameters which are present at a parameter interpolation frequency that is higher than the parameter sampling frequency, the interpolated WFS parameters including integer portions of delay values for the component signal and interpolated fractions of delay values for the component signal, said interpolated fractions constituting delays which define fractions of sample intervals of the audio signal; and processing the audio signal so as to apply the interpolated fractions to the audio signal such that the component signal is calculated with fraction delays which correspond to the interpolated fractions, wherein processing the audio signal may have the steps of: oversampling the audio signal with a predetermined oversampling value; storing the oversampled values within the buffer, the integer portion of the delay value serving as an index; reading out oversampled values from the buffer to the index; interpolating the oversampled values so as to acquire a component signal with the interpolated fraction of the delay value, the oversampled values serving as nodes; or wherein processing the audio signal may have the steps of: processing the audio signal in subfilters, so that each subfilter produces an output signal; storing the output signals of the subfilters within the buffer; reading out the output values from a position which corresponds to the integer portion of the delay value; determining an interpolated value by calculating a polynomial in the interpolated fraction so that a component signal is acquired from the interpolated fraction of the delay value and of the output values of the subfilters, when the computer program runs on a computer.

According to another embodiment, a computer program may have a program code for performing the method of determining a component signal that is suitable for a WFS system including an array of loudspeakers, the WFS system being configured to exploit an audio signal that is associated with a virtual source and that exists as a discrete signal sampled at an audio sampling frequency, and a source position associated with the virtual source, so as to calculate component signals for the loudspeakers on the basis of the virtual source while taking into account loudspeaker positions of loudspeakers of the array of loudspeakers, wherein the method may have the steps of: providing WFS parameters, which include delay values, for the component signal to a loudspeaker of the array of loudspeakers while using the source position and while using a loudspeaker position of the loudspeaker of the array of loudspeakers at a parameter sampling frequency smaller than the audio sampling frequency, the WFS parameters being delay values; interpolating the WFS parameters so as to produce interpolated WFS parameters which are present at a parameter interpolation frequency that is higher than the parameter sampling frequency, the interpolated WFS parameters including integer portions of delay values for the component signal and interpolated fractions of delay values for the component signal, said interpolated fractions constituting delays which define fractions of sample intervals of the audio signal; and processing the audio signal so as to apply the interpolated fractions to the audio signal such that the component signal is calculated with fraction delays which correspond to the interpolated fractions, wherein processing the audio signal may have the steps of: oversampling the audio signal with a predetermined oversampling value; storing the oversampled values within the buffer, the integer portion of the delay value serving as an index; reading out oversampled values from the buffer to the index; interpolating the oversampled values so as to acquire a component signal with the interpolated fraction of the delay value, the oversampled values serving as nodes; or wherein processing the audio signal may have the steps of: processing the audio signal in subfilters, so that each subfilter produces an output signal; storing the output signals of the subfilters within the buffer; reading out the output values from a position which corresponds to the integer portion of the delay value; determining an interpolated value by calculating a polynomial in the interpolated fraction so that a component signal is acquired from the interpolated fraction of the delay value and of the output values of the subfilters, when the computer program runs on a computer, wherein interpolating is performed by means of a Farrow structure.

The core idea of the present invention is that a component signal of a relatively high quality may be achieved in that initially the audio signal belonging to a virtual source is subject to pre-processing, said pre-processing being independent of the WFS parameter, so that improved interpolation is achieved. Thus, the component signal has a higher accuracy, the component signal representing the component which is generated by a virtual source and is for a loudspeaker signal.

In addition, the present invention comprises improved interpolation of the WFS parameters such as, for example, delay or scaling values, which are determined at a low parameter sampling frequency.

Thus, embodiments of the present invention provide a device for determining a component signal for a WFS system comprising an array of loudspeakers, the WFS system being configured to exploit an audio signal that is associated with a virtual source and that exists as a discrete signal sampled at an audio sampling frequency, and source positions associated with the virtual source, so as to calculate component signals for the loudspeakers on the basis of the virtual source while taking into account loudspeaker positions. The inventive device comprises means for providing WFS parameters for a component signal while using a source position and while using the loudspeaker position, the parameters being determined at a parameter sampling frequency smaller than the audio sampling frequency. The device further comprises a WFS parameter interpolator for interpolating the WFS parameters so as to produce an interpolated WFS parameter which is present at a parameter interpolation frequency that is higher than the parameter sampling frequency, the interpolated WFS parameters having interpolated fractions which have a higher level of accuracy than is specified by the audio sampling frequency. Finally, the device comprises audio signal processing means configured to apply the interpolated fractional values to the audio signal, namely such that the component signal is obtained in a state of having been processed at the higher level of accuracy.

The idea of the solution to the problem is therefore based on the fact that the complexity of the overall algorithm is reduced by exploiting redundancy. In this context, the delay interpolation algorithm is partitioned such that it is subdivided into a) a portion for calculating intermediate values, and b) an efficient algorithm for calculating the final results.

The structure of a WFS rendering system is exploited as follows: For each primary source, output signals for all of the loudspeakers are calculated by means of delay interpolation. In this manner, pre-processing is effected for each primary source. It is to be ensured that this pre-processing is independent of the actual delay. In this case, once the data has been pre-processed, it may be used for all of the loudspeaker signals.

Embodiments which implement this principle may be described, for example, by means of two methods.

(i) Method 1: a Combination of Oversampling with a Low-Order Delay Interpolation.

In this method, the input signals are converted, by means of oversampling, to a higher sampling rate prior to storing the input signals into a delay line. This is efficiently performed, e.g., by polyphase methods. The number of "upsampled" values which is correspondingly higher is stored in the delay line.

To generate the output signals, the desired delay is multiplied by the oversampling ratio. This value is used for accessing the delay line. The final result is determined, from the values of the delay line, by a low-order interpolation algorithm (e.g. polynomial interpolation). The algorithm is performed at the original low clock rate of the system.

Combining oversampling with polynomial interpolation for a single delay interpolation operation is novel for application in WFS. A marked increase in performance may therefore be realized in WFS by multiple utilization of the signals generated by oversampling.

(ii) Method 2: Utilization of a Farrow Structure for Interpolation.

The Farrow structure is a variable digital filter for continuously changeable variable delays. It consists of a set of P subfilters. The input signal is filtered by each of said subfilters and provides P different outputs. The $c_P$ output signal results from evaluating a polynomial in d, d being the fractional proportion of the desired delay, and the outputs of the subfilters $c_P$ forming the coefficients of the polynomial.

The algorithm suggested generates, as pre-processing, the outputs of the subfilters for each sample of the input signal. These P values are written into the delay line. The generation of the output signals is effected by accessing the P values in the delay line and by evaluating the polynomial. This efficient operation is performed for each loudspeaker.

In these embodiments, the audio signal processing means is configured to perform the methods (i) and/or (ii).

In a further embodiment, the audio signal processing means is configured to perform oversampling of the audio signal such that said oversampling is performed up to an oversampling rate which ensures a desired level of accuracy. This has the advantage that the second interpolation step becomes redundant as a result.

Embodiments of the present invention describe WFS delay interpolation which is advantageous, in particular, for audio technology and sound technology within the context of wave field synthesis, since clearly improved suppression of audible artefacts is achieved. The improvement is achieved, in particular, by improved delay interpolation in the utilization of fractional delays and asynchronous sampling rate conversion.

Other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
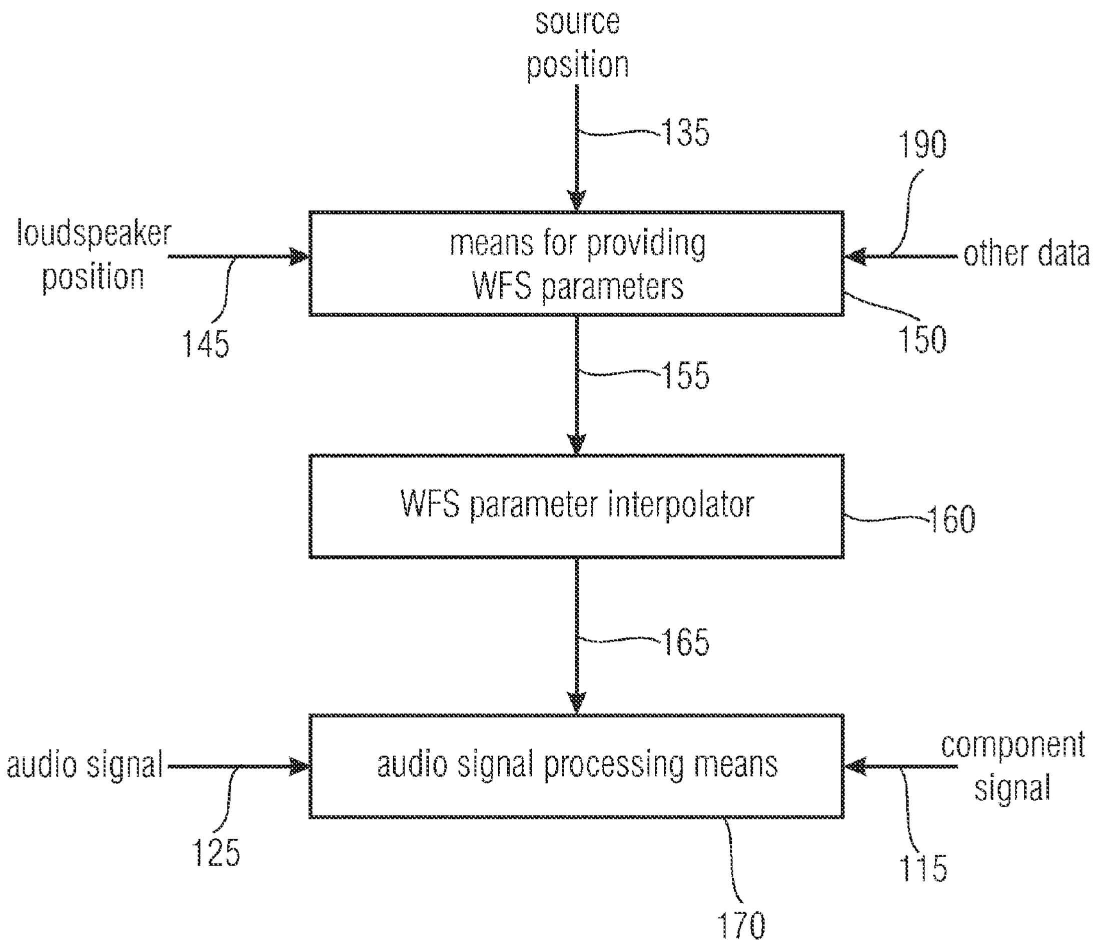
FIG. 1 shows a schematic representation of device in accordance with an embodiment of the present invention.

With regard to the description which follows, it should be noted that in the different embodiments, functional elements that are identical or have identical actions bear identical reference numerals and that, therefore, the descriptions of said functional elements are interchangeable in the various embodiments presented below.

Figure 11:
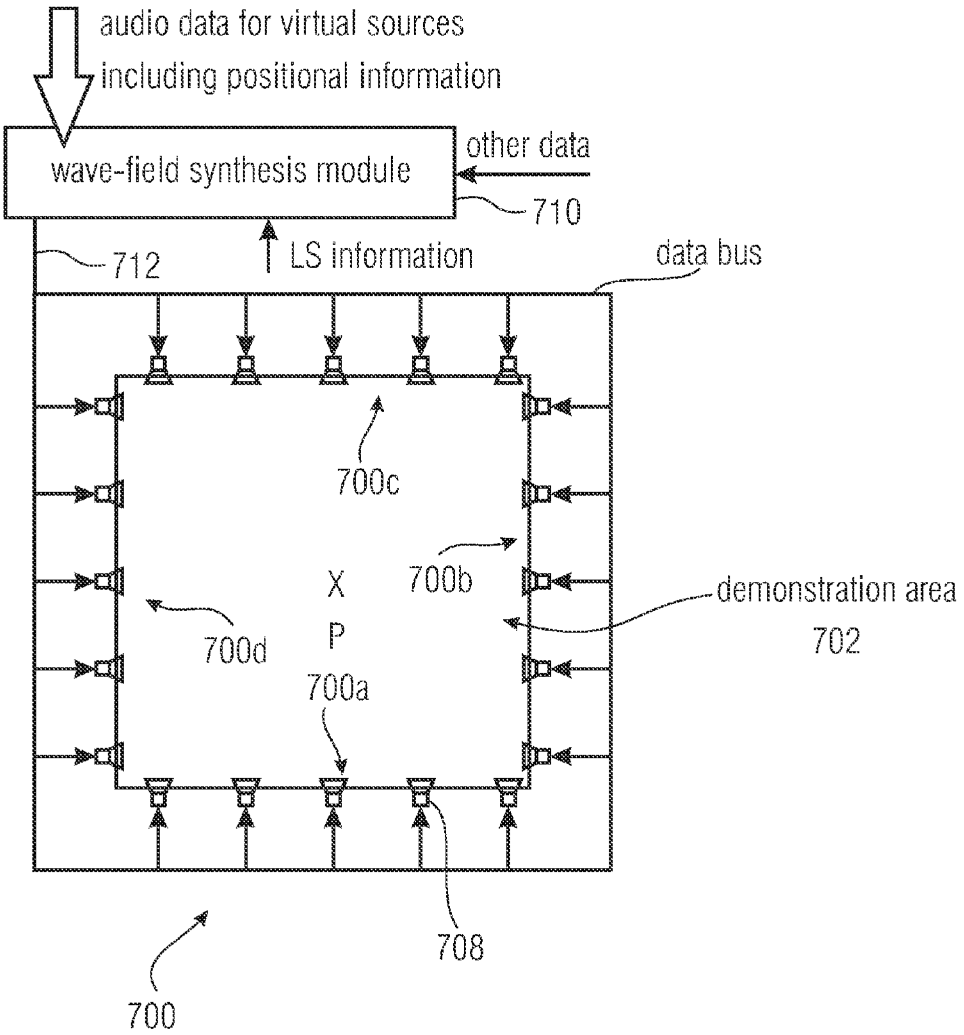
FIG. 11 shows a fundamental block diagram of a wave field synthesis system with a wave field synthesis module and loudspeaker array in a demonstration area.

Before the present invention is addressed in detail, the fundamental architecture of a wave field synthesis system shall be presented below with reference to FIG. 11. The wave field synthesis system has a loudspeaker array 700 that is placed in relation to a demonstration area 702. Specifically, the loudspeaker array shown in FIG. 11, which is a 360° array, comprises four array sides 700*a*, 700*b*, 700*c* and 700*d*. If the demonstration area 702 is a movie theatre, for example, it shall be assumed, with regard to the conventions of front/back or right/left, that the movie screen is located on the same side of the demonstration area 702 on which the sub-array 700*c* is also arranged. In this case, the member of the audience who is seated, in this case, at the so-called optimum point P in the demonstration area 702, would be looking forward, i.e. onto the screen. The sub-array 700*a* would then be located behind said viewer, whereas the sub-array 700*d* would be located to the left of said viewer, and the sub-array 700*b* would be located to the right of said viewer. Each loudspeaker array consists of a number of different individual loudspeakers 708, each of which is controlled using dedicated loudspeaker signals provided by a wave field synthesis module 710 via a data bus 712 that is only schematically shown in FIG. 11. The wave field synthesis module is configured to calculate loudspeaker signals for the individual loudspeakers 708 while using the information about, e.g., the types and locations of the loudspeakers relative to the demonstration area 702, that is, loudspeaker information (LS information), and possibly with other data, said loudspeaker signals in each case being derived, in accordance with the known wave field synthesis algorithms, from the audio data for virtual sources which additionally have positional information associated with them. In addition, the wave field synthesis module may also obtain further inputs comprising, for example, information about the acoustic properties of the demonstration area, etc.

FIG. 1 shows a device in accordance with an embodiment of the present invention. The source position 135 belonging to a virtual source, and the loudspeaker positions 145 are input into a means for providing WFS parameters 150. The means for providing WFS parameters 150 may optionally comprise a further input, where other data 190 may be read in. The other data 190 may comprise, for example, the acoustic properties of a room and other scene data. At a parameter sampling frequency, the means for providing 150 determines therefrom the WFS parameters 155 read into the WFS parameter interpolator 160. Once the interpolation has been performed, the interpolated WFS parameters are provided for the audio signal processing means 170. The audio signal processing means 170 further comprises an input for an audio signal 125 and an output for component signals 115. Each virtual source provides an audio signal of its own, which is processed into component signals for the various loudspeakers.

Figure 2:
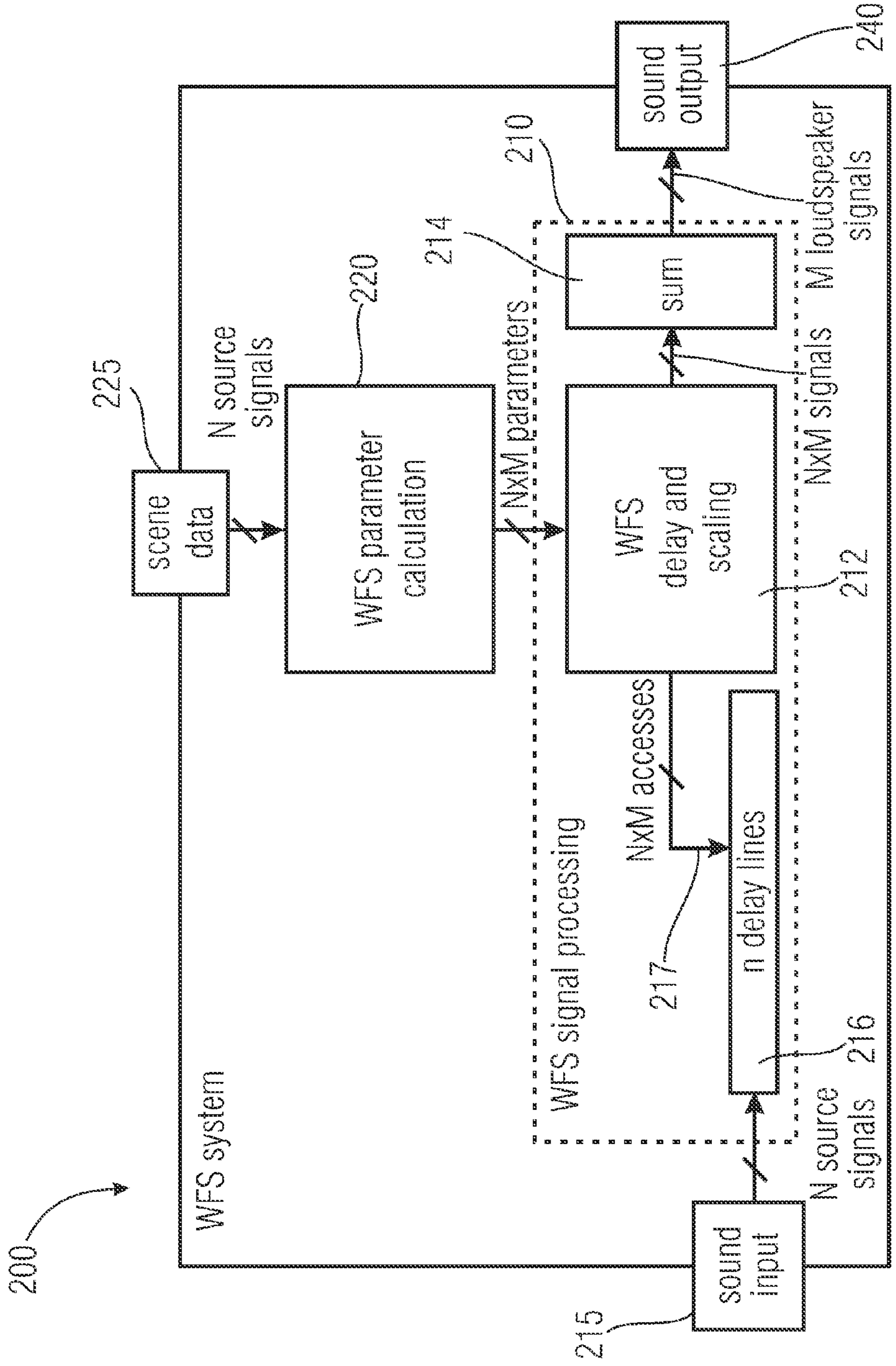
FIG. 2 shows a frequency response for a third-order Lagrange interpolator.

FIG. 2 shows a WFS system 200 comprising WFS signal processing 210 and WFS parameter calculation 220. The WFS parameter calculation 220 comprises an input for scene data 225 relating to N source signals, for example. Assuming that N signal sources (virtual sources) and M loudspeakers are available for the WFS system, the WFS parameter calculation 220 calculates N×M parameter values (scale and delay values). These parameters are output to the WFS signal processing 210. The WFS signal processing 210 comprises a WFS delay and scaling means 212, a means for summing 214, and a delay line 216. The delay line 216 is generally implemented as a means for buffering and may be implemented, for example, by a circular buffer.

The N×M parameters are read in by the WFS delay and scaling means 212. The WFS delay and scaling means 212 further reads the audio signals from the delay line 216. The audio signals in the delay line 216 comprise an index which corresponds to a specific delay and is accessed by means of a pointer 217, so that the WFS delay and scaling means 212 may select, by accessing an audio signal with a specific index, a delay for the corresponding audio signal. The index thus serves at the same time as an address or addressing of the corresponding data in the delay line 216.

The delay line 216 obtains audio input data from the N source signals, which audio input data is stored in the delay line 216 in accordance with its temporal sequence. By correspondingly accessing an index of the delay line 216, the WFS delay and scaling unit 212 may thus read out audio signals that have a desired (calculated) delay value (index). In addition, the WFS delay and scaling means 212 outputs corresponding component signals 115 to the means for summing 214, and the means for summing 214 sums the component signals 115 of the corresponding N virtual sources so as to generate loudspeaker signals for the M loudspeakers therefrom. The loudspeaker signals are provided at a sound output 240.

Embodiments therefore relate to audio signal processing of a WFS rendering system 200. This rendering system contains, as input data, the audio signals of the WFS sources (virtual sources), the index variable n counting the sources, and N representing the number of sources. Typically, this data stems from other system components such as, e.g., audio players, possibly pre-filters, etc. As a further input parameter, amplitude (scaling) and delay values are provided, by the WFS parameter calculation block 220, for each combination of source and loudspeaker (index variable: m, number: M). This is typically performed as a matrix, and the corresponding values for the sources n and loudspeakers m shall be referred to as delay(n,m) and scale(n·m) below.

The audio signals are initially stored in the delay line 216 so as to enable future random access (i.e. with variable delay values).

The core component of the embodiments is the block "WFS delay and scaling" 212. Said block is sometimes also referred to as WFS convolution; however it is not a real convolution in the sense of signal processing, and therefore the term is usually avoided. Here, an output signal (component signal 115) is created for each combination (n, m) of source and loudspeaker.

A delay(n,m)-delayed value is read out, for the signal y(n, m), from the delay line 216 for source n. This value is multiplied by the amplitude scale (n,m).

Finally, the signals y(n, m) of all of the sources n=1, . . . , N are added loudspeaker by loudspeaker, and thus form the control signal for each loudspeaker y(m):

$$Y(m)=y(1,m)+y(2,m)+\ldots+y(N,m).$$

This calculation is performed for each sample of the loudspeaker signals.

As far as a stationary source is concerned, the inventive method and/or device is/are of minor importance in practice. Even though the synthesized wave field deviates, when the delay values are rounded off, from the theoretically defined ideal case, said deviations are nevertheless very small and are fully masked by other deviations that occur in practice, such as spatial aliasing, for example. However, for practical real-time implementation it is not very useful to differentiate between currently non-moving and moving sources. In each case, calculation should be performed using the algorithm for the general case, i.e. for moving sources.

The algorithm is of interest, in particular, for moving sources, but errors occur not only when samples are "swallowed" or are double-used. Rather, approximation of sampled signals at random nodes will cause errors. The methods for approximation between nodes are also referred to as fractional-delay interpolation.

Same make themselves felt, among others, in frequency and phase errors of the output signal. If these errors are time-variant (as in the case of moving sources), various effects (which are often clearly audible) will occur, as will show, e.g., in the frequency range, as amplitude and frequency modulations and as quite complex error spectra caused thereby.

Such errors also occur in the utilization of interpolation methods—what is decisive here is the quality of the method used, which quality, however, typically is associated with a corresponding computing expenditure.

One possibility is the correct omission and insertion of samples, which, however, does not necessarily provide the higher-quality result.

It is the core issue of the present invention to enable utilization of very high-quality delay interpolation methods by structuring the WFS signal processing accordingly, while keeping the computing expenditure comparatively low.

In embodiments of the present invention, the point is not specifically to react to the movement of sources and to try to avoid, in this case, errors caused by correspondingly produced samples. Signal processing does not require any information about source positions, but exclusively delay and amplitude values (which are time-variant in the event of a moving source). The errors described arise due to the manner in which these delay values are applied to the audio signals by the functional unit of WFS delay and scaling 212 (primarily: which method is used for delay interpolation). This is where the present invention comes in so as to reduce the errors by employing high-quality methods of delay interpolation.

As was described above, it is important for a high-value component signal to use a high-quality delay interpolation method. For evaluation purposes, an informal auditory test may be performed, with which the influence of the delay interpolation on the rendering quality within a reproduction system may be assessed.

Rendering may be performed with the current WFS real-time rendering system, wherein various methods of delay interpolation are employed. The algorithms described are used for delay interpolation.

The scenes studied are individual moving sources which perform geometrically simple, pre-calculated movement paths. To this end, the current authoring and rendering application of the rendering system is employed as a scene player. Additionally, an adapted renderer is used which produces fixedly programmed-in paths of movement without any external scene player so as to evaluate the influence of the scene player and of the transmission properties of the network on the quality.

The source signals used are simple, primarily tonal signals, since with said signals, increased perceptibility of delay interpolation artefacts is assumed. One uses signals both below and above the spatial aliasing frequency of the system so as to evaluate the perceptibility both without any influence of the aliasing and the mutual influence of the delay interpolation artefacts and the aliasing interferences.

The following paths of movement are studied:

1. Circular movement of a point source around the array. The radius is selected such that the source is located at a sufficient distance outside the array so as to avoid additional errors, e.g. by switching to the panning algorithm or by a change in the amplitude calculation. The ddd flag is activated in order to increase the delay change rates.
2. Circular movement of a planar wave around the array. The normal direction points in the direction of the center of the array. The other boundary conditions are selected by analogy with the previous experiment.
3. Repeated, linear movement of a point source toward an array front and back again. The reversal of the direction of movement does not occur abruptly so as to avoid pulse-like interferences, but occurs by means of a (e.g. linear) acceleration operation until the source transitions back to a uniform movement as soon as it has reached the target speed. The dd1 flag should be deactivated so as to prevent any influences due to amplitude changes.
4. Linear movement of a planar wave with the normal direction to the array center. The movement of the reference point of the planar wave occurs as in the previous experiment. The ddd flag is activated. The purpose of this experiment is to isolate the rendering errors of the delay interpolation from the other artefacts of moving sources as much as possible: the reference point of a planar wave only serves to provide a temporal basis for the source signal. Thus, a shift produces a uniform sampling rate conversion for all of the secondary source signals. The other parameters of the rendering (scalings of the loudspeaker weights, Doppler shifts of the secondary sources, markedness of the aliasing interference pattern) remain unaffected by the shift.

The quality perceived is informally and subjectively evaluated by several test persons.

The following questions are to be answered:

What influence do the delay interpolation algorithms have on the perceived quality of the WFS rendering?

Which characteristic interferences can be traced back to the delay interpolation, and under which conditions are they particularly marked?

Starting from which quality of the delay interpolation are there no more improvements perceivable?

Various measures of evaluating the quality of fractional delay algorithms are to be presented in the following.

Said measures are to be developed further, and supplemented by new methods, with regard to their applicability. They serve both to assess the quality of algorithms and to specify quality criteria that are used, for example, as targets for design and optimization methods.

The FD filters designed for a specific fractional delay may be studied by using common methods of analyzing discrete systems. In this context, evaluation measures such as complex frequency response, amplitude response, phase response, phase delay, and group delay are employed.

The ideal fractional-delay element has a constant amplitude response with an amplification 1, a linear phase as well as constant phase and group delays which correspond to the desired delay. The corresponding measures may be evaluated for various values of d.

Figure 3:
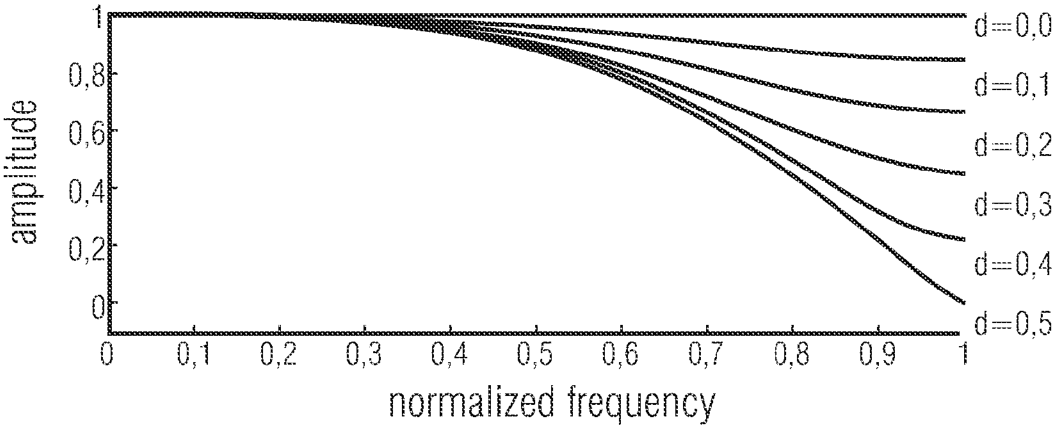
FIG. 3 shows a continuous pulse response for a seventh-order Lagrange interpolator.
Figure 3:
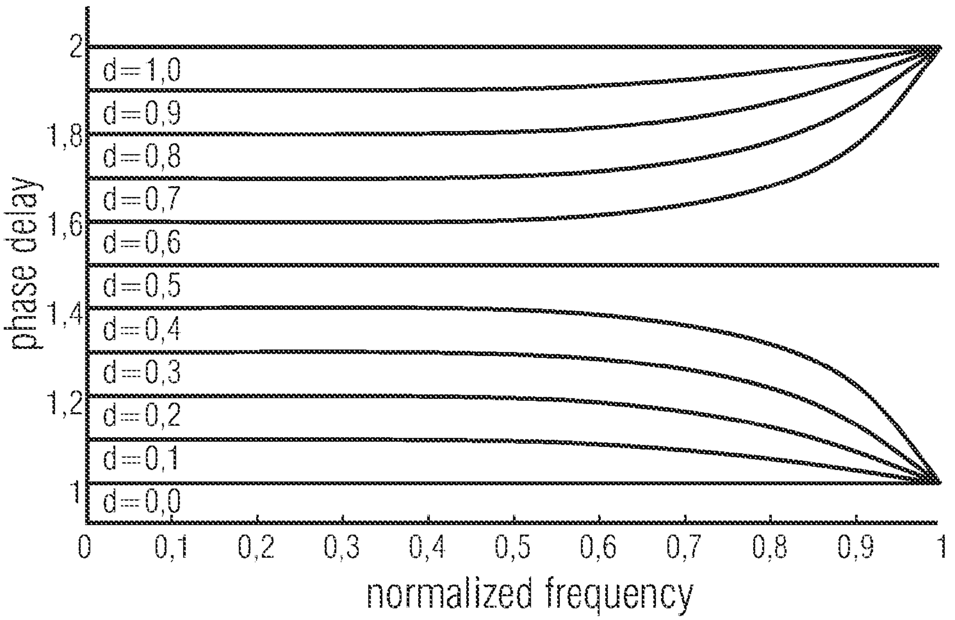

FIG. 3 shows, by way of example, the amplitude response and the phase delay of a third-order Lagrange interpolator for various delay values d. FIG. 3*a* represents a dependence of the amplitude on the normalized frequency, and FIG. 3*b* depicts a dependence of the phase delay on the normalized frequency. Various graphs for various values of d are shown in FIGS. 3*a*, 3*b*, respectively. By way of example, FIG. 3*a* shows the values for d=0; 0.1; 0.2; . . . ; 0.5. By way of example, FIG. 3*b* shows the values for d=0; 0.1; 0.2; . . . ; 1.

Evaluation by means of frequency responses is useful only for time-invariant systems and is therefore not applicable to time-dependent changes in the fractional-delay parameter. In order to study the effects of these changes on the interpolated signal, measures of the difference between an ideal-interpolated signal and a real-interpolated signal, such as the signal/noise ratio (SNR) or the THD+N (total harmonic distortion+noise) measure, may be used. The THD+N measure is used for evaluating the delay interpolation algorithms. To determine the THD+N, a test signal (typically a sinusoidal oscillation) is interpolated with a defined delay curve, and the result is compared with the analytically produced, expected output signal. The delay curve used is typically a linear change.

The subjective evaluation may occur both at an individual channel and in the WFS setup. This comprises employing similar conditions as in the informal auditory test outlined above.

In addition, utilization of objective measuring methods may be considered for evaluating the perceived signals, specifically the PEAQ (perceptual evaluation of audio quality) method. In this context, fairly good matches with the subjectively determined perception quality and with objective quality measures may be established. Nevertheless, the results of even further studies are to be seen critically, since, e.g., the PEAQ test was designed and parameterized for other fields of application (audio coding).

Figure 4:
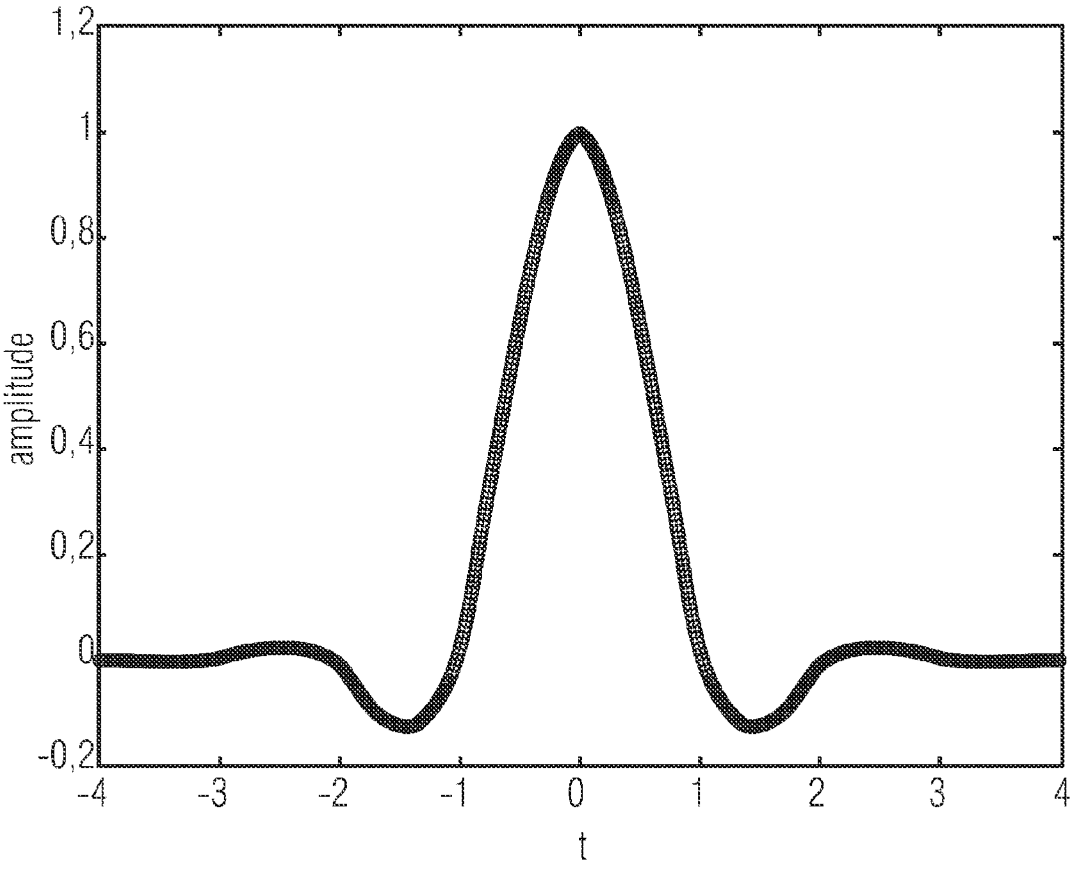
FIG. 4 shows a worst-case amplitude response for Lagrange interpolators of various orders.

FIG. 4 shows an example of such a continuous pulse response produced from a discrete, variable FD filter. Specifically, a continuous pulse response for $7^{th}$-order Lagrange interpolator is shown, the amplitude of the signal being determined as a function of time with the nodes t=0, ±1, ±2, ±3, ±4. The time is normalized such that a maximum (nodes of the pulse) is at t=0. For t values that become smaller or larger, the amplitude tends toward zero.

The continuous pulse response of a continuous variable fractional-delay filter may be used for describing the behavior of such a structure. This continuous form of description can be produced in that the discrete pulse responses are determined for many values of d and are combined into a (quasi) continuous pulse response. By using this form of description, the behavior of FD filters in the utilization for asynchronous sampling rate conversion, i.e., for example, the suppression of aliasing and imaging components is studied, among other things.

From this description, measures of quality may be derived for variable delay interpolation algorithms. On this basis, one can check whether the quality of such a variable filter can be affected by specifically influencing the properties of the continuous pulse response.

In order to be able to provide high-quality component signals, a number of requirements have to be placed upon the algorithm for delay interpolation.

In the following, some requirements placed upon on suitable methods will be defined.

High quality of the interpolation is to be achieved across the entire audio reproduction range. Both such algorithms and parameterizations which orient themselves on the human hearing capacity and such whose errors are no longer perceivable due to other errors within the WFS transmission system are selected.

Random values of the fractional delay and random change rates are to be possible (within the framework of the specified maximum source speeds).

Steady changes in the fractional delay may not lead to interferences (transients).

It may be possible to implement the methods within the renderer unit in a modular manner.

The methods may be implementable in such an efficient manner that real-time performance of entire WFS scenes may be realized (at least perspectively) with an economically acceptable expenditure in terms of hardware.

As was set forth above, the change in the delay times, which is useful for the rendering of moving sources, results in an asynchronous sampling rate conversion of the audio signals. The suppression of the aliasing and imaging effects which occur in the process is the largest problem to be solved in the implementation of a sampling rate conversion. The large range wherein the conversion factor may lie is an additional complicating factor for application in WFS. Therefore, the methods are to be studied with regard to their properties in terms of suppressing such frequencies mirrored into the baseband. It is to be analyzed how the fractional-delay algorithms may be studied with regard to their suppression of alias and image components. The algorithms to be designed are to be adapted on the basis thereof.

For wave field synthesis, a delay interpolation becomes useful for each combination of virtual source and loudspeaker. In connection with the complexity of the delay interpolation, which is useful to achieve high rendering quality, real-time high-quality implementation is not practicable.

Lagrange interpolation is one of the most widespread methods for fractional-delay interpolation—it is one of the most favorable algorithms and suggests itself, for most applications, as the first algorithm to be tested. Lagrange interpolation is based on the concept of polynomial interpolation. For an $N^{th}$-order method, a polynomial of the order N, which runs through N+1 nodes surrounding the location sought, is calculated.

Lagrange interpolation meets the condition of maximal flatness. This means that the error of approximation and its first N derivations disappear at a selectable frequency ω (in practice, ω is almost exclusively selected to be 0). Thus, Lagrange interpolators exhibit a very small error at low frequencies. However, their behavior is less favorable at relatively high frequencies.

Figure 5:
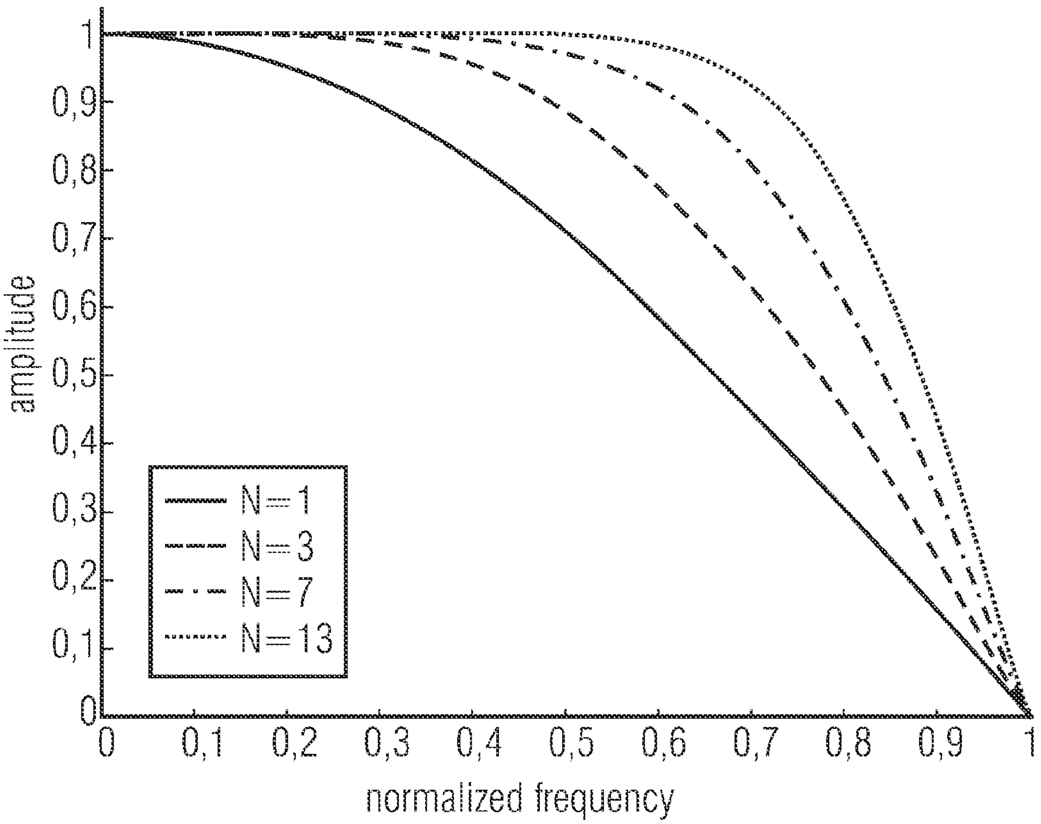
FIG. 5 shows a WFS renderer with WFS signal processing.

FIG. 5 shows a so-called worst-case amplitude response for a Lagrange interpolator of a different order. What is shown is the amplitude in dependence on the normalized frequency ($\omega/\omega_0$ with $\omega_0$ as the cutoff frequency), Lagrange interpolators being shown for the orders N=1, 3, 7, and 13. Even with ascending interpolation orders, the quality at high frequencies is slow to improve.

Even though these properties make the Lagrange interpolation seem less than ideal for application in WFS, this interpolation method may nevertheless be used as a basic element of relatively complex algorithms which do not exhibit these disadvantages mentioned.

The filter coefficients are defined by explicit formulae:

$$h_i = \prod_{k=1,k\neq i}^{N} \frac{d-k}{k-i}. \tag{2}$$

For the direct application of this formula, $O(N^2)$ operations may be used for calculating the N+1 coefficients.

Figure 6A:
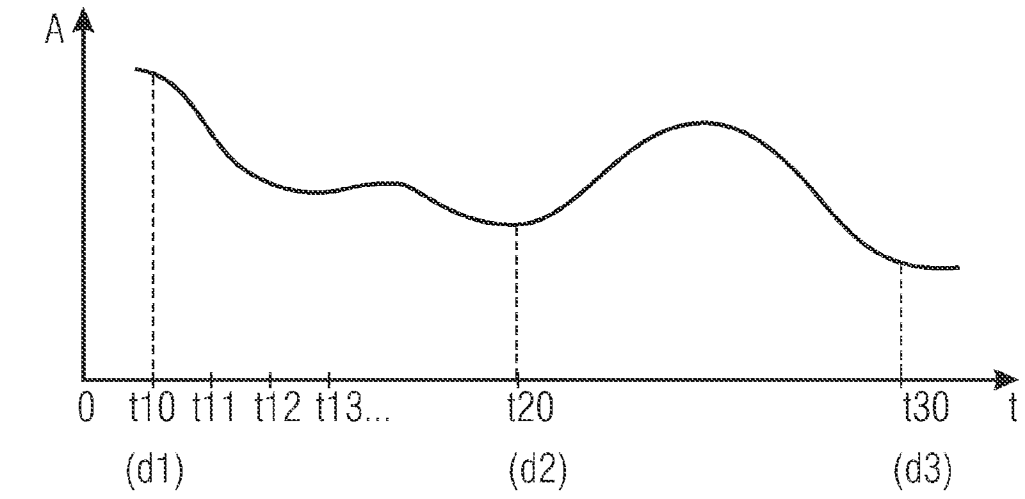
FIGS. 6*a* to 6*c* show representations for amplitudes and delay interpolations.
Figure 6B:
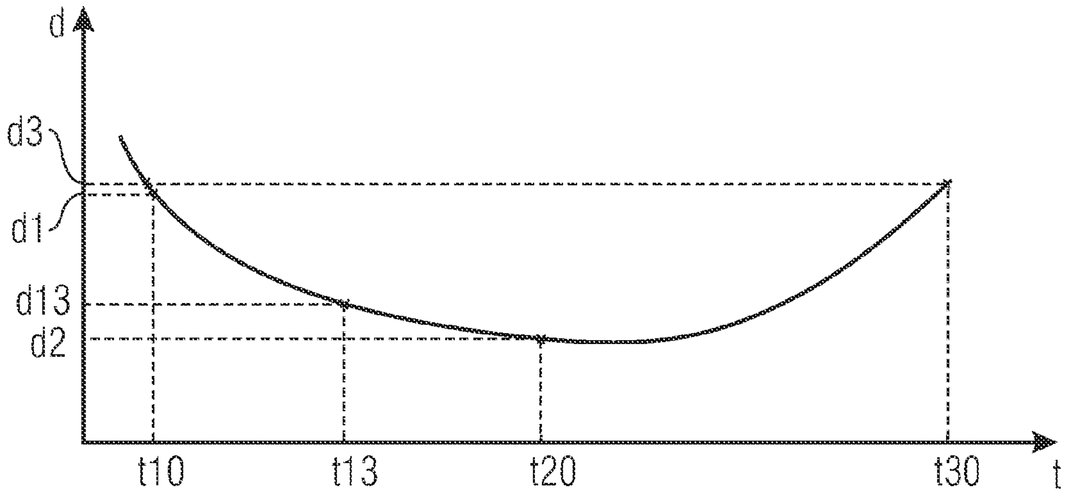
Figure 6C:
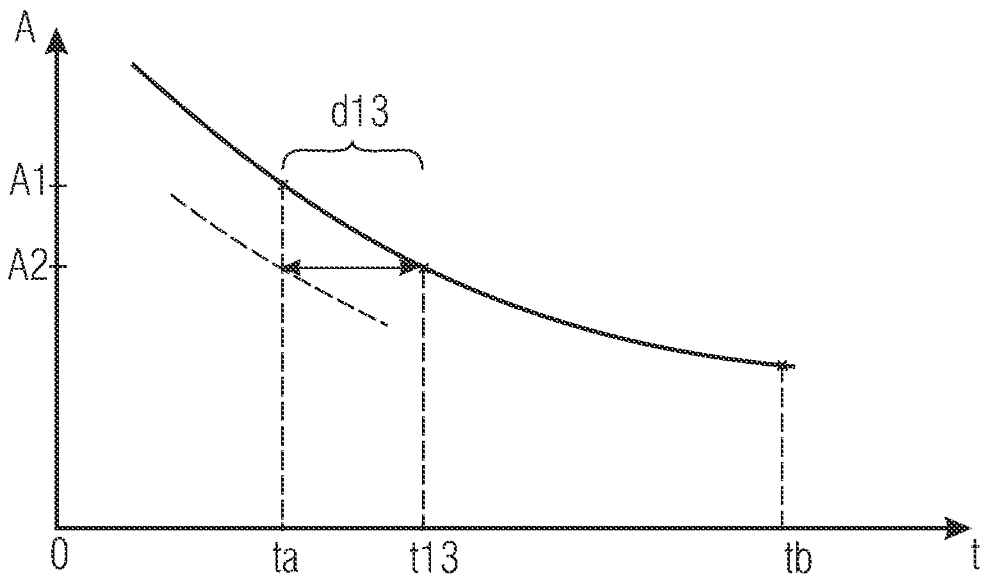

FIGS. 6*a* to 6*c* show representations of an amplitude response and a delay interpolation d.

By way of example, FIG. 6*a* shows an amplitude A of an audio signal as a function of time t. Sampling of the audio signal is effected at the times t10, t11, t12, . . . , t20, t21, etc. Thus, the sampling rate is defined by 1/(t10−t11) (while assuming a constant sampling rate). At a clearly lower frequency, the delay values are recalculated. In the example as is shown in FIG. 6*a*, the delay values at the times t10, t20 and t30 are calculated, a delay value d1 having been calculated at the time t10, a delay value d2 having been calculated at the time t20, and a delay value of d3 having been calculated at the time t30. The points in time when delay values are recalculated may vary; for example, a new delay value may be generated every 32 clocks, or more than 1,000 clocks may pass between calculations of new delay values. In between the delay values, the delay values are interpolated for the individual clocks.

FIG. 6*b* shows an example of how interpolation of the delay values d may be performed. In this context, various interpolation methods are possible. The simplest interpolation is linear interpolation ($1^{st}$-order Lagrange interpolation). Better interpolations are based on higher-order polynomials (higher-order Lagrange interpolation), the corresponding calculation consuming more computing time. FIG. 6*b* shows how the delay value d1 is adopted at the time t10, how the delay value d2 is adopted at the time t20, and how the delay value d3 is present at the time t30. In this context, interpolation results in that, for example, a delay value d13 is present at the time t13. The interpolation is selected such that the nodes at the times t10, t20, t30, . . . occur as part of the interpolated curves.

FIG. 6*c* shows the amplitude A of the audio signal as a function of time t, again, the interval depicted being between t12 and t14. The delay value d13 at the time t13, which is obtained by interpolation, results in that the amplitude is shifted by the delay value d13 at the time t13 to the time ta. In the present example, the shift is toward smaller values in time, which, however, is only a specific embodiment, and which may be different in other embodiments, accordingly. Provided that d13 has a fractional portion, ta does not lie on a sampling time. In other words, access to A2 need not occur at a clock time, and an approximation (e.g. round-off) leads to the above-described problems, which are solved by the present invention.

As was described above, two methods are employed, in particular, in accordance with the invention:

(i) Method 1: combining oversampling with low-order delay interpolation, and (ii) Method 2: using a Farrow structure for interpolation.

At first, method 1 is to be described in more detail.

Methods of changing the sampling rate by a fixed (mostly rational) factor are widespread. Said methods are also referred to as synchronous sampling rate conversion. However, with the aid of such a method, it is only possible to produce output signals for fixed output times. In addition, the methods become very costly if the ratio of the input and output rates is almost irrational (i.e. comprises a very large lowest common multiple).

For these reasons, combining synchronous sampling rate conversion with methods for fractional-delay interpolation is suggested in accordance with the invention.

Implementing a fractional delay with the aid of increasing the sampling rate, and rounding-off to the nearest sampling time, is generally not considered to be expedient, since it presupposes extremely high oversampling rates for expedient signal/noise ratios.

Accordingly, methods have been suggested which consist of two stages: a first step comprises synchronous sampling rate conversion by a fixed integer factor L. Said conversion is performed by means of upsampling (inserting L−1 zero samples after each input value) and subsequent low-pass filtering in order to avoid image spectra. This operation may be efficiently performed by means of polyphase filtering.

A second step comprises fractional-delay interpolation between oversampled values. Said interpolation is performed with the aid of the low-order variable fractional-delay filter whose coefficients are directly calculated. What is particularly useful in this context is to employ Lagrange interpolators (see above).

To this end, linear interpolation may be performed between the outputs of a polyphase filter bank. The primary goal is to reduce the memory and computing power requirements that are useful for almost non-rational ("incommensurate") sampling rate ratios.

It is also possible to introduce a "wideband fractional delay element", which is based on the combination of upampling by the factor 2, of using a low-order fractional-delay filter, and of subsequent downsampling to the original sampling rate. By an implementation as a polyphase structure, the calculation is split up into two independent branches (even taps and odd taps). As a result, the upsampler and downsampler elements need not be implemented discretely. In addition, the fractional-delay element may be implemented at the baseband frequency instead of the oversampled rate. One reason why the quality is improved as compared to purely fractional filters (such as the Lagrange interpolation) is that the variable fractional-delay filter only operates up to half the Nyquist frequency due to the increased sampling rate.

This is conducive to the maximally-flat property of Lagrange interpolation filters, since they exhibit very small errors at low frequencies, whereas the errors occurring at relatively high frequencies can only be reduced by highly increasing the filter order, which is associated with a corresponding increase in the effort exerted for coefficient calculation and filtering.

The principle of wideband fractional-delay filters may also be combined with halfband filters as efficient realizations for anti-imaging filters. The variable fractional-delay elements may be designed on the basis of dedicated structures, among which the so-called Farrow structure (see below) is important.

The model for describing asychronous sampling rate conversion (DAAU—digital asynchronous sampling rate converter, or GASRC=generalized asynchronous sampling rate conversion) consists of a synchronous sampling rate converter (oversampling, or rational sampling rate conversion), followed by a system for replicating a DA/AD conversion, which is typically realized by a variable fractional-delay filter.

However, the combination of synchronous oversampling and variable delay interpolation is relatively widespread in audio technology. This is probably due to the fact that the methods used in this field mostly have developed from synchronous sampling rate converters, which are often designed to comprise several stages themselves.

A special case are filter design methods wherein there are explicit, efficient calculation specifications for the filter coefficients. They are mostly based on interpolation methods used in numerical mathematics. Fractional-delay algorithms based on Lagrange interpolation are most widely spread. With the help of such methods, variable fractional delays may be implemented in a relatively efficient manner. In addition, there are also filters based on other interpolation methods, e.g. spline functions. However, they are less suitable for being used in signal processing algorithms, specifically audio applications.

As compared to such methods of fractional-delay interpolation which are based on directly calculating the filter coefficients, the significant reduction of the filter order of the variable portion enables significant reduction of the computing expenditure.

The particular advantage of the method presented for application in wave field synthesis is that the oversampling operation need only be performed once for each input signal, whereas the result of this operation may be used for all of the loudspeaker signals calculated by this renderer unit. Thus, accordingly higher computing expenditure may be dedicated to oversampling, specifically in order to keep the errors low across the entire audio rendering range. The variable fractional-delay filtering, which may be performed separately for each output signal, may be performed much more efficiently due to the lower filter order that may be used. Also, one of the decisive disadvantages of FD filters with explicitly calculated coefficients (i.e., above all, Lagrange FD filters), namely their poor behavior at high frequencies, is compensated by the fact that they only need to operate within a much lower frequency range.

In a WFS rendering system, the algorithm proposed is implemented as follows, in accordance with the invention:

- The source signals that exist in the form of discrete audio data are oversampled with a fixed, integer factor L. This is effected by inserting L−1 zero samples between two input signals in each case, and by subsequently performing low-pass filtering using an anti-imaging filter so as to avoid replications of the input spectrum in the oversampled signal. This operation is efficiently realized by using polyphase techniques.
- The oversampled values are written into a delay line 216 usually implemented as a circular buffer. It is to be noted that the capacity of the delay line 216 is to be increased by the factor L as compared to conventional algorithms. This represents a trade-off between memory and computing complexity, which trade-off may be selected for the algorithm designed here.
- In order to read out the delay line, the desired value of the delay is to be multiplied by the oversampling rate L. By splitting off the non-integer portion, an integer index $d_{int}$ as well as a fractional portion $d_{frac}$ is obtained. If the optimum working range of the variable FD filter deviates from $0 \le d_{frac} \le 1$, this operation is to be adapted, so that $(N-1)/2 \le d_{frac} \le (N+1)/2$ applies, for example, to the Lagrange interpolation. The integer portion is used as an index for accessing the delay line so as to obtain the nodes of the interpolation. The coefficients of the Lagrange interpolation filter are determined from $d_{frac}$. The interpolated output signals result from convoluting the nodes with the calculated filter coefficients. This operation is repeated for each loudspeaker signal.

Figure 7:
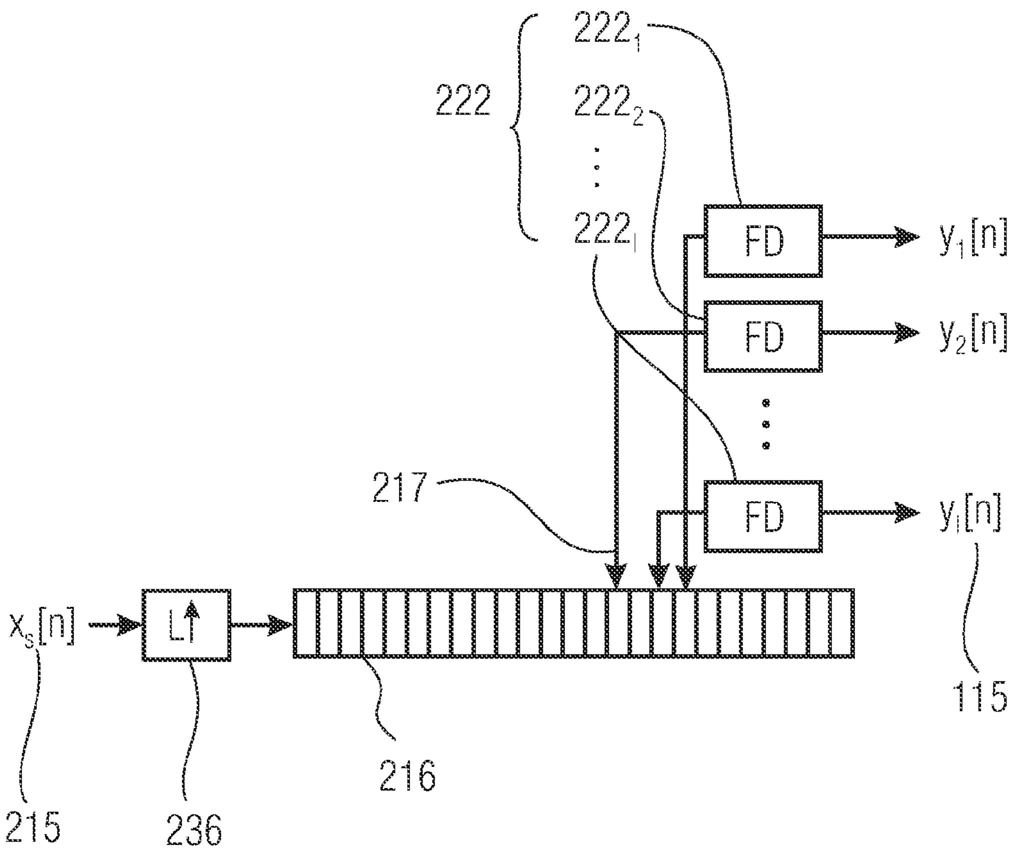
FIG. 7 shows a delay interpolation by means of oversampling and simultaneous readout as a Lagrange interpolation.

FIG. 7 shows a specific representation of a delay interpolation by means of oversampling in accordance with a first embodiment of the present invention, simultaneous readout being performed by means of Lagrange interpolation. The discrete audio signal data $x_s$ (from the audio source 215) is oversampled, in this embodiment, by means of oversampling within the sampling means 236, and are subsequently stored, in the delay line 216, in accordance with the chronological order. Thus, a sample results in each memory of the delay line 216, said sample resulting in a predetermined point in time tm (see FIG. 6*a*). The corresponding oversampled values in the delay line 216 may then be read out by the WFS delay and scaling means 212, the pointer 217 reading out the sample in accordance with the delay value. This means that a pointer 217 which points further to the left in FIG. 7 corresponds to more current data, i.e. having a slight delay, and the pointer 217 which points further to the right in FIG. 7 corresponds to audio data or samples with a higher seniority (i.e. a larger delay). In accordance with the index in the delay line 216, however, only the integer portions of the delay values are detected, and corresponding interpolation to the fractional (rational) portions takes place in the fractional-delay filters 222. The outputs of the fractional-delay filters 222 output the component signals 115. The component signals 115 ($y_i$) are subsequently summed for various virtual sources $x_s$ and output to the corresponding loudspeakers (loudspeaker signals).

The filters may be statically designed outside the runtime of the application. Thus, efficiency requirements placed upon the filter design are irrelevant; it is possible to use high-performance tools and optimization methods.

The optimum anti-imaging filter (also referred to as prototype filter, since it is the prototype for the subfilters used for polyphase realization) is an ideal low pass with the discrete cutoff frequency $$f_c = \frac{\pi}{L},$$

π corresponding to the sampling frequency of the oversampled signal.

For designing realizable low-pass filters it is useful to specify additional degrees of freedom. This takes place, above all, by defining transition bands, or don't-care bands, wherein no specifications are provided in terms of the frequency response. These transition bands are defined by means of the above-specified audio frequency band. The width of the transition band is decisive for the filter length that may be used for achieving a desired stop band attenuation. A transition range in the range of $2f_c \leq f \leq 2(f_s - f_c)$ results. $f_c$ is the desired upper cutoff frequency, and $f_s$ is the sampling frequency of the non-oversampled signal.

Figure 8:
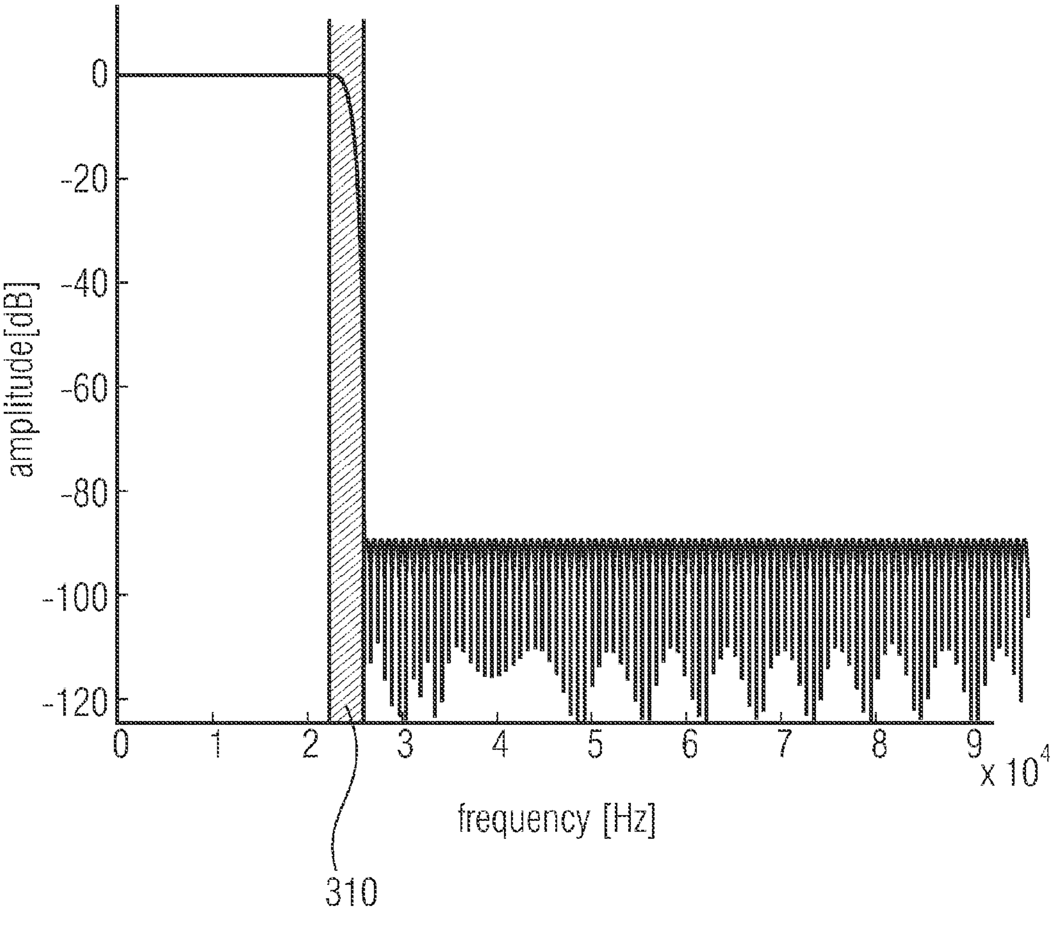
FIG. 8 shows a specification of the anti-imaging filter for oversampling, transition band specified for baseband only.

FIG. 8 shows a specification of the frequency response of an anti-imaging filter for oversampling, the transition band 310 being specified for a baseband only.

Figure 9:
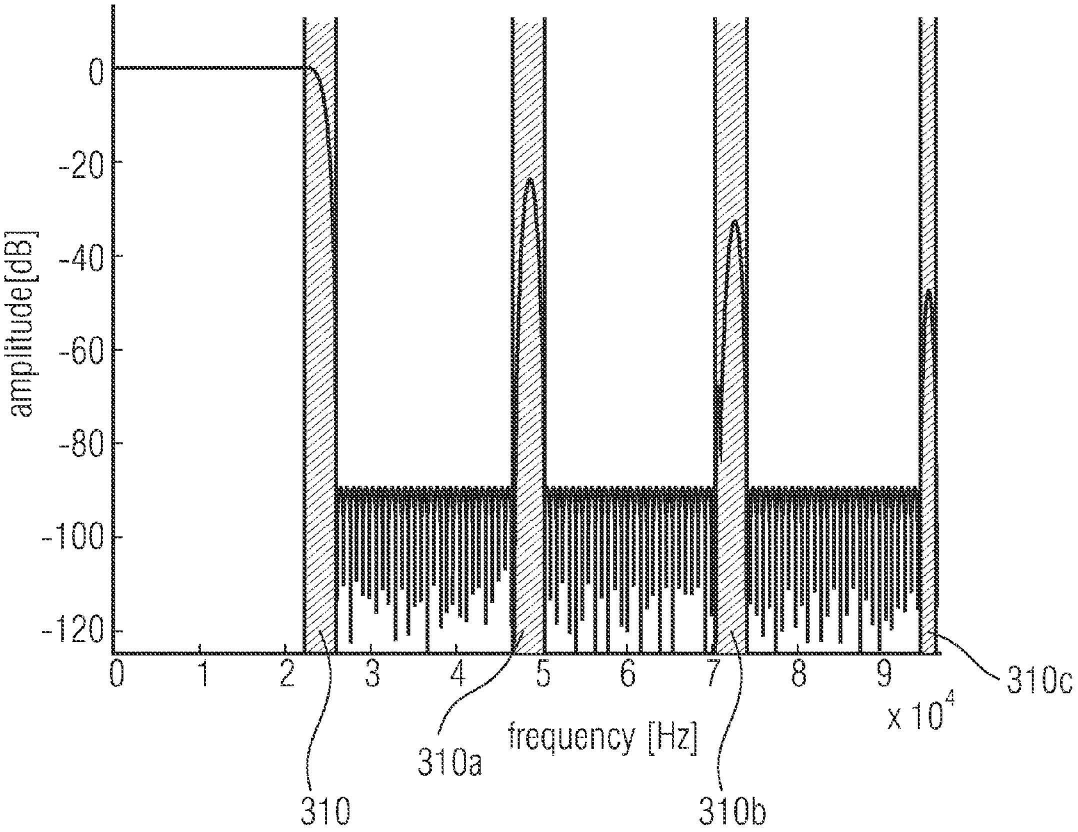
FIG. 9 shows a specification of the anti-imaging filter for oversampling and a so-called "don't care" region also for images of the transition band.

FIG. 9 shows a specification of an anti-imaging filter for oversampling, so-called don't-care regions also being determined for images 310*a*, 310*b*, 310*c* of the transition band 310. The additional don't-care bands may be defined at the images of the original transition range 310.

However, since oversampling only serves as the first stage of asynchronous sampling rate conversion, and since this conversion entails a shift of frequency contents, utilization of multiple transition bands is to be critically looked at so as to avoid shifting of imaging and/or aliasing components into the audible frequency range.

The anti-imaging filter is designed almost exclusively as a linear-phase filter. Phase errors should be absolutely avoided at this point, since it is the aim of the delay interpolation to influence the phase of the input signal in a targeted manner. For a realization as a polyphase system, linear-phasedness does not apply to the subfilters, however, so that the corresponding savings in complexity cannot be benefited from.

For designing the prototype filter, known filter design methods may be employed. Particularly relevant are least-squares methods (in Matlab: firls) as well as equiripple methods (also referred to as minimax or Chebyshev optimization, Matlab function: firpm). With the application of firpm it is to be noted that with relatively large filter lengths ($N_{pp}$>256), often convergence does not occur. However, this is only due to the numerics of the tool used (here: Matlab) and might be neutralized by a corresponding implementation.

Since the oversampled signal is formed by insertion of L−1 zero samples in each case, an amplification by the factor L occurs for the original signal amplitude to be maintained. This is possible, without any additional computer expenditure, by multiplying the filter coefficients by this factor.

Unlike direct methods of delay interpolation such as Lagrange interpolation, the combined algorithm comprises various mutually dependent parameters that determine the quality and complexity. They include, above all:

(a) Filter length of the prototype filter $N_{pp}$. It determines the quality of the anti-imaging filtering while at the same time influencing the performance. However, since the filtering is only used once for each input signal, the influence on the performance is relatively small. The length of the prototype filter also decisively determines the system latency that is due to the delay interpolation.

(b) Oversampling ratio L. L determines the useful capacity (storage requirement) of the delay line 216. In modern architectures, this also has an impact, via the cache locality, on the performance. In addition, as L increases, the filter length that may be used for achieving a desired filter quality is also affected, since L polyphase subfilters may be used, and since the transition bandwidths decrease as L increases.

(c) Rendering frequency range. The rendering frequency range determines the width of the transition range of the filter and thus influences the filter length that may be used for achieving a desired filter quality.

(d) Interpolation order N. The most far-reaching influence on the performance and quality is exerted by the order of the variable fractional-delay interpolator, which is typically implemented as a Lagrange interpolator. Its order determines the computing expenditure involved in obtaining the filter coefficients and the convolution itself. N also determines the number of values from the delay line 216 that may be used for convolution, and thus also specifies the memory bandwidth that may be used. Since the variable interpolation may be used for each combination of input signal and output signal, the selection of N has the largest impact on the performance.

Among these parameters, a combination is to be found which is ideal for the respective purpose of application as regards quality and performance aspects. To this end, the interaction of the various stages of the algorithm is to be analyzed and to be verified by means of simulations.

The following considerations should be taken into account:

The oversampling rate L should be selected to be moderate, a ratio between 2 and 8 should not be exceeded.

The variable interpolation should not exceed a low order (what is aimed at is a maximum of 3). At the same time, odd interpolation orders are to be used, since even orders have clearly more significant errors, by analogy with the behavior of the pure Lagrange interpolation.

In order to analyze the filter, the equivalent static filter may be analyzed in addition to simulations with real input signals. For this purpose, for a fixed fractional delay, the filter coefficients of the prototype filters involved in the Lagrange interpolation are determined, multiplied by the corresponding Lagrange weights, and summed after performing the useful index shifts. Thus, the algorithm may be analyzed in terms of the criteria described in section 4 (frequency response, phase delay, continuous pulse response) without having to observe the particularities of multi-rate processing.

Therefore, an algorithm for determining the equivalent static FD filters is to be implemented. What is problematic about this is only specification of the filter length so as to obtain comparable values for all of the values of d, since the equivalent filters access, in dependence on d, various samples of the input signal.

The static delay determined by the interpolation filter is dependent on the order of oversampling L, on the phase delay of the polyphase prototype filter, as well as on the interpolation order. If the prototype filter is of linear phase, the following system delay will result:

$$D_{system} = \frac{N_{pp} + N}{2L}. \tag{3}$$

The algorithm presented constitutes an approach to improving delay interpolation which is practical and relatively simple to realize. The additional performance requirement as compared to a method for delay interpolation comprising direction calculation of the coefficients is very low. This conflicts with a clear reduction of the rendering errors, specifically at relatively high frequencies. Unlike the direct methods such as Lagrange interpolation, it is possible to realize, at reasonable expenditure, rendering that is free from perceivable artefacts across the entire audio rendering range. What is decisive for the performance of the method is efficiently obtaining the integer and fractional delay parameters, calculating the Lagrange coefficients, and performing the filtering.

The design tools employed for determining the performance-determining parameters are kept relatively simple: L, $N_{pp}$ and N may be determined on the basis of external limitations or by means of experiments. The filter design of the prototype filter is performed using standard methods for low-pass filters, possibly while exploiting additional don't-care regions.

What comes next is a detailed description of method 2 (using a Farrow structure for interpolation), which represents an alternative inventive approach.

The Farrow structure is a variable filter structure for implementing a variable fractional delay. It is a structure that is based on an FIR filter and whose behavior may be controlled via an additional parameter. For the Farrow structure, the fractional portion of the delay is used as a parameter so as to image a controllable delay. The Farrow structure is an instance of a variable digital filter, even though it was developed independently thereof.

The variable characteristic is achieved by forming the coefficients of the FIR filter by means of polynomials.

$$h[n] = \sum_{m=0}^{M} c_{nm} d^m, \tag{4}$$

wherein d is the controllable parameter. The transfer function of the filter is thus determined to become:

$$H(z, d) = \sum_{n=0}^{N} \sum_{m=0}^{M} c_{nm} d^m z^{-n} \tag{5}$$

For efficient implementation, this transfer function is often realized as follows:

$$H(z, d) = \sum_{m=0}^{M} d^m \sum_{n=0}^{N} c_{nm} z^{-n} \tag{6}$$

$$= \sum_{m=0}^{M} d^m C_m(z) \tag{7}$$

The output of the Farrow structure may thus be realized as a polynomial in d, the coefficients of the polynomial being the outputs of M fixed subfilters $C_m(z)$ in an FIR structure. The polynomial evaluation may be efficiently realized by applying the Homer scheme.

The output signals of the fixed subfilters $C_m(z)$ are independent of a specific, fractionally rational delay d. In accordance with the scheme introduced above for exploiting redundant calculations, these values lend themselves as intermediate results that may be used for evaluating the output signals for all of the secondary sources.

The inventive algorithm based thereon is structured as follows:

- Each input signal is convoluted in parallel with M subfilters.
- The output values of the subfilters are written (combined for a sampling time in each case) into a delay line 216.
- For determining the delayed output signals, the integer portion of the delay is determined, and the index of the desired data in the delay line 216 is determined therefrom.
- The subfilter outputs at this position are read out and used as coefficients in a polynomial interpolation in d, the fractionally rational delay portion.
- The result of the polynomial interpolation is the desired delayed input value. The last three steps are repeated for each output signal.

Figure 10:
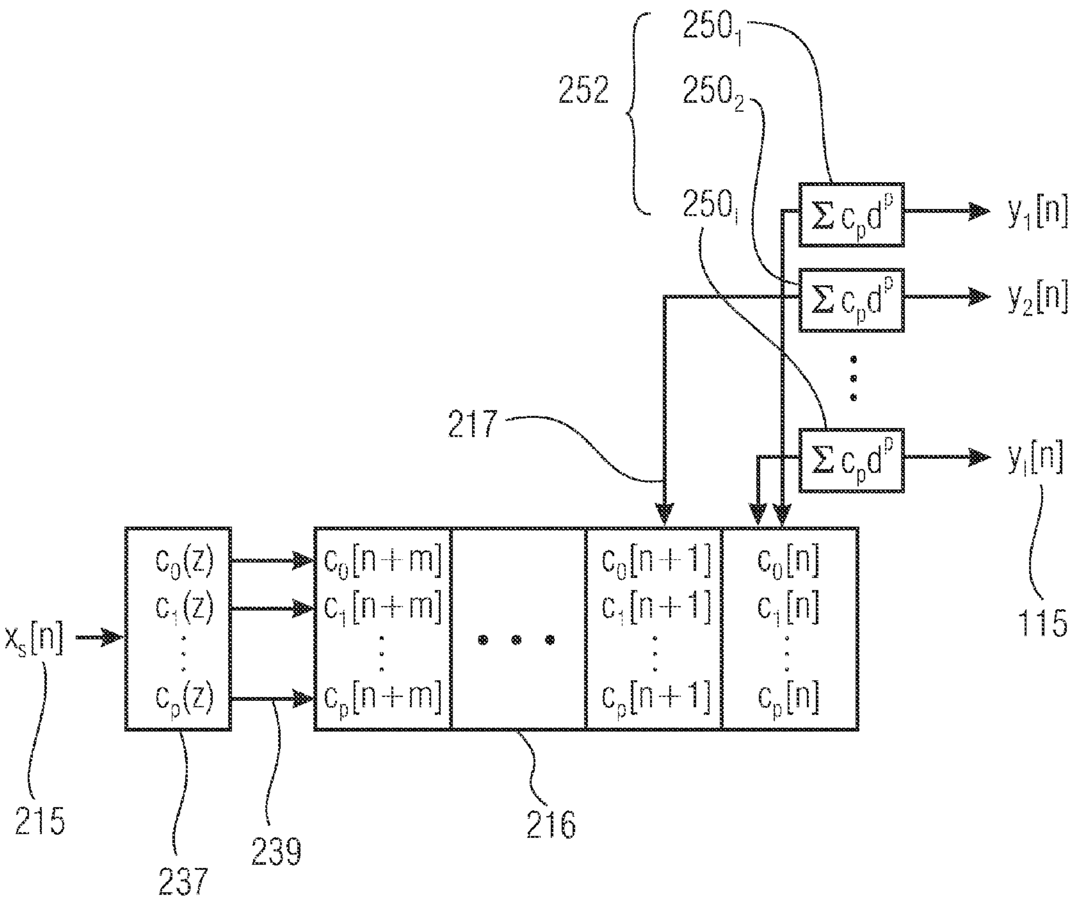
FIG. 10 shows a delay interpolation with simultaneous readout on the basis of the Farrow structure.

FIG. 10 schematically shows this algorithm, which may also be summarized as follows. Simultaneous readout is performed on the basis of a Farrow structure, the data of an audio signal $x_s$ being input into a delay line 216. However, in this embodiment, it is not the audio data itself that is input, but instead the coefficients $c_p$ are calculated as output values 239 of the Farrow structure (subfilter 237), and are stored in the delay line 216 in accordance with their chronological order—unlike the embodiment previously depicted (see FIG. 7). As was also the case previously, access to the delay line 216 is performed by a pointer 217, whose position, in turn, is selected in accordance with the integer portion of the delay d. By reading out the corresponding $c_i$ coefficients of the Farrow structure, the corresponding (delayed) loudspeaker signal $y_i$ may be calculated therefrom by means of an exponential series in the delay value or of the fractional (non-integer) portion of the delay value (in a means for polynomial interpolation 250).

Application of the Farrow structure is not tied to specific design methods for determining the coefficients $c_{nm}$. For example, the error integral $$Q = \int_{\omega_0}^{\omega_1} \int_{\alpha_0}^{\alpha_1} \left| \sum_n \sum_m c_{nm} e^{jn\omega T} - e^{j\omega\alpha T} \right|^2 d\alpha\, d\omega \tag{8}$$

may be minimized. This corresponds to a least-squares optimization problem.

Various methods based on least-squares or weighted least-squares criteria are possible. Said methods aim at minimizing the mean square error of the method across the desired frequency range and the definition range of the control parameter d. In the weighted least-squares method (WLS), a weighting function is additionally defined which enables weighting the error in the integration region. On the basis of WLS, iterative methods may be designed, by means of which the error may be specifically influenced in certain regions of the integration area, for example in order to minimize the maximum error. Most WLS methods exhibit poor numerical conditioning. This is not due to unsuitable methods, but results from the use of transition bands (don't-care regions) in the filter design. Therefore, with these methods, only Farrow structures of a comparatively short subfilter length N and a comparatively low polynomial order M may be designed, since otherwise numerical instabilities limit the accuracy of the parameters or prevent convergence of the method.

Another class of design methods is aimed at minimizing the maximum error in the working range of the variable fractional-delay filter. That area which is spanned by the desired frequency range and the allowed range for the control parameter d is defined as the working range. This type of optimization is mostly referred to as minimax or Chebyshev optimization.

For conventional linear-phase FIR filters without control parameters, there are efficient algorithms for Chebeyshev approximation, e.g. the remez exchange algorithm or the Parks-McClellan algorithm based thereon. Said algorithm may also be expanded to accommodate random complex frequency responses and, therefore, also for phase responses demanded of fractional-delay filters.

Generally, Chebyshev or minimax optimization problems generally may be solved by methods of linear optimization. These methods are several orders of magnitude more costly than those based on the remez exchange algorithm. However, they enable directly formulating and solving the design problem for the subfilters of the Farrow structure. In addition, said methods enable formulating additional secondary conditions in the form of equality or inequality conditions. This is considered to be a very important feature for designing asynchronous sampling rate converters.

A method for a minimax design for Farrow structures is based on algorithms for limited optimization (optimization methods allowing secondary conditions to be indicated are referred to as constrained optimization). A special feature of said design methods for Farrow structures is that separate specifications may be specified for amplitude and phase errors. For example, the maximum phase error may be minimized while specifying an admissible maximum amplitude error. Together with precise tolerance specifications for amplitude and phase errors, which result, for example, from the perception of corresponding errors, this represents a very powerful tool for application-specific optimization of the filter structures.

A further development of the Farrow structure is the proposed modified Farrow structure. By introducing a symmetrical definition range for the control parameter d, typically $$-\frac{1}{2} \leq d \leq \frac{1}{2},$$

it can be ensured that the subfilters of an optimum Farrow filter are linear in phase. For even and odd m, they alternatingly comprise symmetrical and anti-symmetrical coefficients, so that the number of the coefficients to be determined is reduced to half. In addition to a resulting reduced complexity of the filter design and to an associated improved numerical conditioning of the optimization problem, the linear-phase structure of the $C_m(z)$ also enables utilizing more efficient algorithms for calculating the subfilter outputs.

Additionally, various other methods of designing the Farrow structure are possible. One method is based on a singular-value decomposition, and on the basis thereof, efficient structures for implementation have also been developed. This method offers a level of accuracy of the filter design which is higher as compared to WLS methods and exhibits reduced filter complexity, but offers no possibilities of specifying secondary conditions or of specifically influencing amplitude or phase error boundaries.

A further method is based on inherent filters. Since this approach has so far not been followed up in literature, it is not yet possible to make any statements about the performance without any dedicated implementation and evaluation, but it should be similar to the SVD methods.

The primary goal of the filter design is to minimize the deviation from the ideal fractional delay. In this context, either the maximum error or the (weighted) mean error may be minimized. Depending on the method employed, either the complex error or the phase and amplitude responses may be specified separately.

An important factor in setting up the optimization conditions is the selection of the frequency range of interest.

The form of the associated continuous pulse response (see above) has a large influence on the quality and the perceivable quality of the asynchronous sampling rate conversion. Therefore, utilization of secondary conditions directly related to the continuous pulse response is to be studied. In this manner, continuity requirements, for example, may be specified.

A demand made in many delay-interpolation applications is to observe the interpolation condition. Said interpolation condition involves that the interpolation at the discrete nodes be exact, i.e. adopts the value of the samples. In design methods that allow the definition of secondary conditions in the form of equality conditions, this requirement may be formulated directly. Farrow implementations of Lagrange interpolators meet this requirement on account of the definition of the Lagrange interpolation. The benefit of the interpolation condition for asynchronous sampling rate conversion in general, and in particular in the context of WFS, is therefore classified as being rather low. What is more important than exact interpolation at specific nodes is a generally small error, a small maximum deviation, and/or as uniform an error curve as possible.

The Farrow structure represents a very high-performing filter structure for delay interpolation. For application in wave field synthesis, efficient partitioning of the algorithm into pre-processing per source signal as well as an evaluation operation that may be performed at low complexity and is performed for each output signal may be implemented.

For the coefficients of the Farrow structure, there are many different design methods that differ in terms of computing complexity and quality achievable. Besides these, additional constraints relating directly or indirectly to the characteristic of the desired filter may be defined in many methods. This design freedom results in a larger research expense for evaluating various methods and secondary conditions before optimum parameterizations are found. However, the desired method may be adapted to the specification with high accuracy. This is very likely to enable a reduction of the filter complexity with identical quality requirements.

The algorithm for WFS which is based on the Farrow structure may be efficiently implemented. On the one hand, reductions in the complexity that result from the linear-phase subfilter of the modified Farrow structure may be exploited in pre-filtering. On the other hand, evaluation of the pre-calculated coefficients as a polynomial evaluation is possible in a highly efficient manner on the basis of the Horner scheme.

A great advantage of this filter structure is also the existence of closed design methods which enable a targeted design.

Further possibilities of implementations and optimizations may be summarized as follows.

Embodiments primarily address the development of novel algorithms for delay interpolation for application in wave field synthesis. Even though these algorithms are generally independent of any specific implementation and target platform, the aspects of implementation cannot be left unconsidered at this point. This is due to the fact that the algorithms described here constitute by far the largest portion of the overall performance of a WFS reproduction system. Therefore, the following aspects of implementation are considered, among others, in addition to the algorithmic complexity (e.g. the asymptotic complex or the number of operations):

(i) Parallelizability. In this context, parallelizability at the instruction level is considered, above all, since most modern processors offer SIMD instructions.

(ii) Dependencies on instructions. Intense and long-standing relationships of dependency of partial results of the algorithm complicate the compilation of efficient codes and reduce the efficiency of modern processors.

(iii) Conditional code. Case differentiations reduce the efficiency of the implementation and are also problematic to maintain and to test.

(iv) Code and data localities. Since delay interpolation takes place within the innermost loop of the WFS signal processing algorithm, a compact code is relatively important. In addition, the number of cache misses for data accesses also influences the performance.

(v) Memory bandwidth and memory access pattern. The number of memory accesses, their distribution and alignment may often have a significant influence on the performance.

Since standard PC components will be employed for the rendering unit of the rendering system in the near and medium-term future, current PC platforms are used as the basis for the implementation. However, it is assumed that most findings obtained in this manner will also be relevant to other system architectures due to the fact that the underlying concepts are mostly similar.

The pre-filtering that was introduced above is efficiently performed as a polyphase operation. This comprises simultaneously convoluting the input data with L different subfilters, the outputs of which are combined, by means of multiplexing, into the upsampled output signal. The filtering may also occur by means of linear convolution or fast convolution on the basis of the FFT. For implementation by means of FFT, the Fourier transformation of the input data need only occur once and may then be used several times for simultaneous convolution with the subfilters. However, it is to be carefully considered, for the relatively short subfilter lengths used, whether convolution by means of Fourier transformation entails advantages as compared to direct implementation. For example, a low-pass filter designed by means of a Parks-McLellan algorithm (Matlab function firpm) of the length 192 has a stop band attenuation of more than 150 dB. This corresponds to a subfilter length of 48; filters longer than that can no longer be designed in a numerically stable manner. In any case, the results of the subfilter operations may be inserted into the output data stream in an interleaved manner. One possibility of efficiently implementing such a filter operation consists in using library functions for polyphase or multi-rate filtering, e.g. from the Intel IPP Library.

Pre-processing of the algorithm on the basis of the Farrow structure may also be efficiently performed by means of such a library function for multi-rate processing. In this context, the subfilters may be combined into a prototype filter by means of interleaving, the output values of the function represent the interleaved output values. However, the linear-phasedness of the subfilters that are designed in accordance with the modified Farrow structure may be exploited to reduce the number of operations for the filtering. However, it is very likely that a dedicated implementation will be useful in this context.

It has been proven that time discretization of the delay parameter has a decisive influence on the achievable quality of an FD algorithm for asynchronous delay interpolation. Therefore, all of the algorithms designed process a value, calculated per sample, of the delay parameter (referred to as being exact to the sample). Said values are calculated by means of linear interpolation between two nodes. It is assumed, and the assumption is supported by informal auditory tests, that this interpolation order is sufficiently precise.

For fractional-delay algorithms, the desired delay may be subdivided into an integer portion and a fractionally rational portion. For the modified Farrow structure, the range [0 . . . 1) is not mandatory, but the range may also be selected, for example, to be [−½ . . . ½) or [N−1)/2 . . . (n+1)/2) in the Lagrange interpolation. However, this does not change anything about the fundamental operation. With parameter interpolation that is exact to the sample, this operation is to be performed for each elementary delay interpolation and therefore has a significant influence on the performance. Therefore, efficient implementation is very important.

Audio signal processing of WFS consists in a delay operation and in scaling of the delayed values for each audio sample and each combination of source signal and loudspeaker. For efficient implementation, these operations are performed together. If these operations are performed separately, a significant reduction in the performance is to be expected as a result of the expenditure involved in parameter transition, additional control flow and degraded code and data localities.

Therefore, it is useful to integrate the generation of the scaling factors (this is typically effected by means of linear interpolation between nodes) and the scaling of the interpolated values into the implementation of the WFS convolution.

Once the methods have been implemented, they are to be evaluated by means of measurements and subjective assessments.

In addition, it is also to be estimated from which degree of quality onward no further gain in quality can be achieved since the improvements are masked by other error sources of the overall WFS system. The objective and subjective quality achieved is to be compared with the resources that may be useful for it.

In a final reflection, the present concept of signal processing in a wave field synthesis rendering system may also be described as follows.

It has turned out that the delay interpolation, i.e. the delay of the input values by random delay values, has a decisive influence both with regard to the rendering quality and with regard to the performance of the overall system.

Due to the very large number of delay interpolation operations that may be used, and to the comparatively high level of complexity of said operations, application of known algorithms for fractional-delay interpolation cannot be realized at an economically reasonable expense in terms of resources.

Therefore, on the one hand, an in-depth analysis of the algorithms and of the properties of these filters which may be used for a good subjective perception are useful in order to guarantee sufficient quality at minimum expenditure. On the other hand, the overall structure of WFS algorithmics is to be studied in order to develop, on the basis thereof, methods which significantly reduce the overall complexity of the method. In this context, a processing structure has been identified which enables marked reduction of the computing expenditure by splitting up the delay interpolation algorithm into a pre-processing stage and the multiple access to the pre-processed data. Two algorithms have been designed on the basis of this concept:

1. A method on the basis of an oversampled delay line 216 and of the multiple access to these values by low-order Lagrange interpolators enables a rendering quality that is clearly increased as compared to pure low-order Lagrange interpolation while requiring only slightly increased computation expenditure. This method is comparatively simple to parameterize and to implement, but offers no possibilities of specifically influencing the quality of the interpolation, and exhibits no closed design method.
2. A further algorithm is based on the Farrow structure and offers a large amount of design freedom, for example the application of a multitude of optimization methods for designing the filter coefficients. The increased research and implementation expenditure is offset by possibilities of specifically influencing the properties of the interpolation as well as a potential for a more efficient implementation.

In the realization, both methods can be implemented and compared from the point of view of quality and performance. Trade-offs are to be found between these aspects. The influence of improved delay interpolation on the overall rendering quality of the WFS reproduction system may be studied under the influence of the other known rendering errors. In this context, the level of interpolation quality up to which an improvement may be achieved in the overall system is to be specified.

One goal is to design methods that achieve, at acceptable expenditure, a quality of the delay interpolation that does not generate any perceivable interferences even without any masking effects caused by other WFS artefacts. Thus, it would be ensured also for future improvements of the rendering system that delay interpolation has no negative influence on the quality of the WFS rendering.

Several topics that are possible as an extension of the present document shall be presented below.

When implementing a WFS rendering system, filter operations are provided for the input and/or output signals in most cases. For example, a prefilter stage is employed in the WFS system. These are static filters that are applied to each input signal so as to achieve the 3 dB effect resulting from the theory of the WFS operators, and to achieve a loudspeaker-independent frequency response adaptation to the rendering space.

It is generally possible to combine such a filter operation with the oversampling anti-imaging filter. In this context, the prototype filter is designed once; at the runtime of the system, only one filter operation may be used for realizing both functionalities.

Similarly, a combination of a random static and source-independent filter operation with the Farrow subfilters can be realized. In this context, both the multiplication of a Farrow filter bank designed using standard methods as well as direct adaptation of the filter bank to a predefined amplitude response is possible.

Combining both filters also offers the possibility of reducing the phase delay of the system which is caused by (specifically linear-phased) filters, if said phase delay may be used in only one filter component.

Therefore, it is to be studied in what way a combination of the conventional WFS filters with the filter operations useful for the delay operation methods presented here is useful. In this context, the specifically computational load that may be used for separate and combined execution of the filter operations are to be compared. In addition, the changes in WFS signal processing that are provided for future further developments (e.g. pre-filtering dependent on the source position, loudspeaker-specific filtering of the output signals) are to be observed.

It has been found that interpolation of the delay parameter that is exact to the sample is indispensable for high-quality delay interpolation. The scale parameter was interpolated at the same temporal resolution. The influence on the rendering impression exerted by a relatively coarse discretization of this parameter is to be studied. However, it is to be noted that a corresponding increase in the step size gives reason to expect only a small increase in performance of the overall algorithm.

In addition, efficient signal processing for delay interpolation has been investigated. The sampling rate conversion implemented in this manner simulates the Doppler effect of a moving virtual source. Further, in many applications, the frequency shift caused by the Doppler spread is undesired. It is possible, due to the methods for high-quality delay interpolation that have been implemented here, that the Doppler effect becomes more apparent than it has been so far. Therefore, future research projects should also comprise studying algorithms so as to compensate for the Doppler effect in the event of rendering moving sources, or to control its intensity. However, these methods will also be based, at the lowest level, on the algorithms for delay interpolation that have been presented here.

Thus, embodiments provide an implementation of a high-quality method for delay interpolation as may be exploited, for example, in wave field synthesis rendering systems. Embodiments also offer further developments of algorithmics for wave field synthesis reproduction systems. In this context, methods of delay interpolation will be specifically addressed, since said methods have a large influence on the rendering quality of moving sources. Due to the quality requirements and the extremely high influence of these algorithms on the performance of the overall rendering system, novel signal processing algorithms for wave field synthesis may be used. As was explained in detail above, it is thus possible, in particular, to take into account interpolated fractions with a higher level of accuracy. This higher level of accuracy makes itself felt in a clearly improved auditory impression. As was described above, artefacts which occur, in particular, with moving sources can hardly be heard due to the increased level of accuracy.

In particular, embodiments describe two efficient methods which meet said requirements and which have been developed, implemented and analyzed.

In particular, it shall be noted that, depending on the conditions, the inventive scheme may also be implemented in software. Implementation may be on a digital storage medium, in particular a disc or a CD with electronically readable control signals which can cooperate with a programmable computer system such that the corresponding method is performed. Generally, the invention therefore also consists in a computer program product comprising a program code, stored on a machine-readable carrier, for performing the inventive method, when the computer program product runs on a computer. In other words, the invention may therefore be realized as a computer program having a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for determining a component signal that is suitable for a wave field synthesis system comprising an array of loudspeakers, the wave field synthesis system being configured to exploit an audio signal that is associated with a virtual source and that exists as a discrete signal sampled at an audio sampling frequency, and a source position associated with the virtual source, so as to calculate component signals for the loudspeakers on the basis of the virtual source while taking into account loudspeaker positions of loudspeakers of the array of loudspeakers, the device comprising:

a provider for providing wave field synthesis parameters for the component signal to a loudspeaker of the array of loudspeakers while using the source position and while using a loudspeaker position of the loudspeaker of the array of loudspeakers at a parameter sampling frequency smaller than the audio sampling frequency, the wave field synthesis parameters comprising delay values;

a wave field synthesis parameter interpolator for interpolating the wave field synthesis parameters so as to produce interpolated wave field synthesis parameters which are present at a parameter interpolation frequency that is higher than the parameter sampling frequency, the interpolated wave field synthesis parameters comprising integer portions of delay values and interpolated fractions of delay values, the interpolated fractions constituting delays which define fractions of sample intervals of the audio signal; and an audio signal processor comprising:

a preprocessor that comprises an oversampler, the preprocessor being configured to process the audio signal, which is associated with the virtual source, independently of the wave field synthesis parameters, and the oversampler being configured to oversample the audio signal, which is present as a discrete signal sampled at an audio sampling frequency;

a buffer for buffering the processed audio signal, the buffer being configured to store the processed audio signal index by index, so that each index corresponds to a predetermined time value of the audio signal; and a producer for producing the component signal, the producer being configured to produce the component signal from a processed audio signal belonging to a specific index, it being possible for said specific index to be determined from the integer portion of the delay value, the audio signal processor being configured to apply the interpolated fractions to the processed audio signal such that the component signal is calculated with fraction delays which correspond to the interpolated fractions.

2. The device as claimed in claim 1, wherein the audio processor comprises a summer, and the summer is configured to sum the component signals and to provide them at a sound output for the array of loudspeakers.

3. The device as claimed in claim 1, wherein the oversampler is configured to perform oversampling with a predetermined oversampling value.

4. The device as claimed in claim 3, wherein the oversampling value is between 2 and 8.

5. The device as claimed in claim 1, wherein the oversampler comprises a polyphase filter.

6. The device as claimed in claim 1, wherein the producer comprises a delay filter, and the delay filter is configured to read out values from the buffer and to perform fractional delay interpolation with a predetermined order, the values comprising the specific index and one or more neighboring values thereof, the delay filter producing the component signal.

7. The device as claimed in claim 6 wherein the predetermined order of the fractional delay interpolation is odd, and the predetermined order is ≤3 or ≤7.

8. The device as claimed in claim 6, wherein the delay filter comprises a Lagrange interpolator.

9. The device as claimed in claim 1, wherein the audio signal processor further comprises a pre-filtering stage, and the pre-filtering stage is configured to perform a loudspeaker-independent frequency response adaptation to a rendering space, and wherein the pre-filtering stage comprises the oversampler.

10. A method of determining a component signal that is suitable for a wave field synthesis system comprising an array of loudspeakers, the wave field synthesis system being configured to exploit an audio signal that is associated with a virtual source and that exists as a discrete signal sampled at an audio sampling frequency, and a source position associated with the virtual source, so as to calculate component signals for the loudspeakers on the basis of the virtual source while taking into account loudspeaker positions of loudspeakers of the array of loudspeakers, the method comprising:

providing wave field synthesis parameters, which comprise delay values, for the component signal to a loudspeaker of the array of loudspeakers while using the source position and while using a loudspeaker position of the loudspeaker of the array of loudspeakers at a parameter sampling frequency smaller than the audio sampling frequency, the wave field synthesis parameters being delay values;

interpolating the wave field synthesis parameters so as to produce interpolated wave field synthesis parameters which are present at a parameter interpolation frequency that is higher than the parameter sampling frequency, the interpolated wave field synthesis parameters comprising integer portions of delay values for the component signal and interpolated fractions of delay values for the component signal, said interpolated fractions constituting delays which define fractions of sample intervals of the audio signal; and processing the audio signal so as to apply the interpolated fractions to the audio signal such that the component signal is calculated with fraction delays which correspond to the interpolated fractions, processing the audio signal comprising:

oversampling the audio signal with a predetermined oversampling value;

storing the oversampled values within a buffer, the integer portion of the delay value serving as an index;

reading out oversampled values from the buffer to the index;

interpolating the oversampled values so as to acquire a component signal with the interpolated fraction of the delay value, the oversampled values serving as nodes.

11. A non-transitory storage medium having stored thereon a computer program comprising a program code for performing the method of determining a component signal that is suitable for a wave field synthesis system comprising an array of loudspeakers, the wave field synthesis system being configured to exploit an audio signal that is associated with a virtual source and that exists as a discrete signal sampled at an audio sampling frequency, and a source position associated with the virtual source, so as to calculate component signals for the loudspeakers on the basis of the virtual source while taking into account loudspeaker positions of loudspeakers of the array of loudspeakers, the method comprising:

providing wave field synthesis parameters, which comprise delay values, for the component signal to a loudspeaker of the array of loudspeakers while using the source position and while using a loudspeaker position of the loudspeaker of the array of loudspeakers at a parameter sampling frequency smaller than the audio sampling frequency, the wave field synthesis parameters being delay values;

interpolating the wave field synthesis parameters so as to produce interpolated wave field synthesis parameters which are present at a parameter interpolation frequency that is higher than the parameter sampling frequency, the interpolated wave field synthesis parameters comprising integer portions of delay values for the component signal and interpolated fractions of delay values for the component signal, said interpolated fractions constituting delays which define fractions of sample intervals of the audio signal; and processing the audio signal so as to apply the interpolated fractions to the audio signal such that the component signal is calculated with fraction delays which correspond to the interpolated fractions, processing the audio signal comprising:

oversampling the audio signal with a predetermined oversampling value;

storing the oversampled values within the buffer, the integer portion of the delay value serving as an index;

reading out oversampled values from the buffer to the index;

interpolating the oversampled values so as to acquire a component signal with the interpolated fraction of the delay value, the oversampled values serving as nodes.

* * * * *